United States Patent
Ma et al.

(10) Patent No.: US 12,136,976 B2
(45) Date of Patent: Nov. 5, 2024

(54) ELECTRONIC DEVICE, WIRELESS COMMUNICATION METHOD, AND COMPUTER-READABLE STORAGE MEDIUM

(71) Applicant: Sony Group Corporation, Tokyo (JP)

(72) Inventors: Ke Ma, Beijing (CN); Wendong Liu, Beijing (CN); Zhaocheng Wang, Beijing (CN); Jianfei Cao, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/001,874

(22) PCT Filed: Jul. 20, 2021

(86) PCT No.: PCT/CN2021/107291
§ 371 (c)(1),
(2) Date: Dec. 15, 2022

(87) PCT Pub. No.: WO2022/022327
PCT Pub. Date: Feb. 3, 2022

(65) Prior Publication Data
US 2023/0239020 A1    Jul. 27, 2023

(30) Foreign Application Priority Data
Jul. 27, 2020   (CN) .......................... 202010731265.4

(51) Int. Cl.
*H04B 7/06*    (2006.01)
*H04B 7/08*    (2006.01)
*H04L 5/00*    (2006.01)

(52) U.S. Cl.
CPC ......... *H04B 7/0617* (2013.01); *H04B 7/0626* (2013.01); *H04B 7/088* (2013.01); *H04L 5/0048* (2013.01)

(58) Field of Classification Search
CPC .... H04B 7/0617; H04B 7/0626; H04B 7/088; H04L 5/0048
See application file for complete search history.

(56) References Cited

U.S. PATENT DOCUMENTS 10,951,273 B2 * 3/2021 Zhou ................... H04B 7/0408
2013/0315083 A1 * 11/2013 Jung ....................... H04B 7/26
370/252

(Continued)

FOREIGN PATENT DOCUMENTS

CN    106953673 A    7/2017
CN    108811097 A    11/2018

(Continued)

OTHER PUBLICATIONS

International Search Report and Written Opinion mailed on Oct. 8, 2021, received for PCT Application PCT/ CN2021/107291, filed on Jul. 20, 2021, 9 pages including English Translation.

(Continued)

*Primary Examiner* — Jaison Joseph
(74) *Attorney, Agent, or Firm* — XSENSUS LLP

(57) ABSTRACT

An electronic device, a wireless communication method, and a computer-readable storage medium. The electronic device comprises a processing circuit, configured to send two reference signals using identical time-frequency resources and respectively using two beams in a beam pair, wherein a spatial distance between the two beams in the beam pair is greater than a predetermined value, and the two reference signals satisfy a predetermined constraint relation. The efficiency of a beam training process can be improved, and the time consumption of the beam training process is (Continued)

reduced, thereby achieving a compromise between beam training overheads and beamforming gains.

11 Claims, 20 Drawing Sheets

(56) References Cited

U.S. PATENT DOCUMENTS

| | | | |
|---|---|---|---|
| 2018/0309553 A1* | 10/2018 | Cao | H04L 5/0048 |
| 2019/0306909 A1* | 10/2019 | Zhou | H04B 7/06966 |
| 2023/0239020 A1* | 7/2023 | Ma | H04B 7/0696 |
| | | | 375/262 |

FOREIGN PATENT DOCUMENTS

| | | |
|---|---|---|
| CN | 109391296 A | 2/2019 |
| WO | 2019/166973 A1 | 9/2019 |

OTHER PUBLICATIONS

Ma et al., "Deep Learning Assisted mmWave Beam Prediction with Prior Low-frequency Information", arXiv:2011.02332v2, Feb. 8, 2021, 7 pages.

\* cited by examiner

ELECTRONIC DEVICE, WIRELESS COMMUNICATION METHOD, AND COMPUTER-READABLE STORAGE MEDIUM

CROSS-REFERENCE TO RELATED APPLICATIONS

The present application is based on PCT filing PCT/CN2021/107291, filed Jul. 20, 2021, which claims priority to Chinese Patent Application No. 202010731265.4, titled "ELECTRONIC DEVICE, WIRELESS COMMUNICATION METHOD, AND COMPUTER READABLE STORAGE MEDIUM", filed on Jul. 27, 2020, with the China National Intellectual Property Administration, each of which is incorporated herein by reference in its entirety.

FIELD

The embodiments of the present disclosure generally relates to the field of wireless communications, and in particular to an electronic device, a wireless communication method, and a computer readable storage medium. More particularly, the present disclosure relates to an electronic device as a network side device in a wireless communication system, an electronic device as a user equipment in a wireless communication system, a wireless communication method performed by a network side device in a wireless communication system, a wireless communication method performed by a user equipment in a wireless communication system, and a computer readable storage medium.

BACKGROUND

Beamforming technology has great advantages in terms of expanding coverage, improving edge throughput, and suppressing interference and the like. In general, the larger number of transmission antennas and transmission beams indicates a greater beamforming gain and a higher overhead in a beam training process, resulting in a reduction of time for transmitting valid data, which may affect system efficiency.

Generally, a base station side may be configured with multiple radio frequency links. However, due to limits by hardware complexity and power consumption of a user equipment side, only a single radio frequency link may be used to receive a downlink reference signal and data on the user equipment side. Therefore, the base station side may only transmit one beam in a same time-frequency resource. If the number of beams to be trained is large, a large overhead for beam training will be introduced. Since the number of beams supported in a high-frequency band is greater than that supported in a low-frequency band, this problem is particularly obvious in the high-frequency band.

Therefore, it is necessary to propose a technical solution to study a more effective beam training method, so as to improve efficiency of a beam training process and reduce time consumption of the beam training process, thereby realizing a tradeoff between an overhead for beam training and a beamforming gain.

On the other hand, in the existing beam training process, a base station periodically broadcasts multiple transmission beams, and a user equipment determines a transmission beam with a best reception quality. In a case that the base station broadcasts multiple transmission beams for many times, the user equipment may adopt different reception beams, so as to determine a best reception beam. As the user equipment moves, the base station is required to periodically perform a beam training process with the user equipment to update a best transmission beam and a best reception beam.

In a scenario in which the user equipment is moving at a high speed, the base station is required to reduce a cycle of beam training process to update a best transmission beam and a best reception beam in time, which increases an overhead for beam training.

Therefore, it is necessary to propose a technical solution to optimize a beam training process, so as to reduce an overhead for beam training.

SUMMARY

A general summary of the present disclosure is provided in this section, which is not a comprehensive disclosure of the full scope or all features of the present disclosure.

An object of the present disclosure is to provide an electronic device, a wireless communication method, and a computer readable storage medium, in order to improve efficiency of a beam training process and reduce time consumption of the beam training process, thereby realizing a tradeoff between an overhead for beam training and a beamforming gain.

According to an aspect of the present disclosure, an electronic device is provided. The electronic device includes a processing circuit. The processing circuit is configured to transmit two reference signals using a same time-frequency resource and using two beams in a beam pair, respectively, where a spatial distance between the two beams in the beam pair is greater than a predetermined value, and the two reference signals satisfy a predetermined constraint relationship.

According to another aspect of the present disclosure, an electronic device is provided. The electronic device includes a processing circuit. The processing circuit is configured to: receive multiple downlink signals, each of the downlink signals including two reference signals transmitted using a same time-frequency resource and using two beams, respectively, where a spatial distance between the two beams is greater than a predetermined value, and the two reference signals satisfy a predetermined constraint relationship; determine a downlink signal with a best reception quality from the multiple downlink signals; and determine a beam with a best reception quality from the two beams carrying the downlink signal with the best reception quality.

According to another aspect of the present disclosure, a wireless communication method is provided. The wireless communication method includes: transmitting two reference signals using a same time-frequency resource and using two beams in a beam pair, respectively, where a spatial distance between the two beams in the beam pair is greater than a predetermined value, and the two reference signals satisfy a predetermined constraint relationship.

According to another aspect of the present disclosure, a wireless communication method is provided. The wireless communication method includes: receiving multiple downlink signals, each of the downlink signals including two reference signals transmitted using a same time-frequency resource and using two beams, respectively, where a spatial distance between the two beams is greater than a predetermined value, and the two reference signals satisfy a predetermined constraint relationship; determining a downlink signal with a best reception quality from the multiple downlink signals; and determining a beam with a best reception quality from the two beams carrying the downlink signal with the best reception quality.

According to another aspect of the present disclosure, a computer readable storage medium is provided. The computer readable storage medium includes executable computer instructions that, when executed by a computer, cause the computer to perform the wireless communication method according to the present disclosure.

According to another aspect of the present disclosure, a computer program is provided. The computer program, when executed by a computer, causes the computer to perform the wireless communication method according to the present disclosure.

Using an electronic device, a wireless communication method, and a computer readable storage medium according to the present disclosure, two reference signals satisfying a predetermined constraint relationship may be transmitted using a same time-frequency resource and using two beams with a spatial distance greater than a predetermined value, respectively. In this way, two beams may be transmitted at the same time in the same time-frequency resource, which can improve efficiency of a beam training process and reduce time consumption of the beam training process.

Another object of the present disclosure is to provide an electronic device, a user equipment, a wireless communication method, and a computer readable storage medium, in order to reduce an overhead for beam training.

According to an aspect of the present disclosure, an electronic device is provided. The electronic device includes a processing circuit. The processing circuit is configured to: predict a best transmission beam of the electronic device at one or more time points based on historical information of a best transmission beam of the electronic device or historical information of channel state information of a channel between the electronic device and a user equipment; and perform beam switching based on the predicted best transmission beam of the electronic device at the one or more time points.

According to another aspect of the present disclosure, a user equipment is provided. The user equipment includes a processing circuit. The processing circuit is configured to: predict a best reception beam of the user equipment at one or more time points based on historical information of a best reception beam of the user equipment or historical information of channel state information of a channel between the user equipment and a network side device; and perform beam switching based on the predicted best reception beam of the user equipment at the one or more time points.

According to another aspect of the present disclosure, a wireless communication method performed by an electronic device is provided. The wireless communication method includes: predicting a best transmission beam of the electronic device at one or more time points based on historical information of a best transmission beam of the electronic device or historical information of channel state information of a channel between the electronic device and a user equipment; and performing beam switching based on the predicted best transmission beam of the electronic device at the one or more time points.

According to another aspect of the present disclosure, a wireless communication method performed by a user equipment is provided. The wireless communication method includes: predicting a best reception beam of the user equipment at one or more time points based on historical information of a best reception beam of the user equipment or historical information of channel state information of a channel between the user equipment and a network side device; and performing beam switching based on the predicted best reception beam of the user equipment at the one or more time points.

According to another aspect of the present disclosure, a computer readable storage medium is provided. The computer readable storage medium includes executable computer instructions that, when executed by a computer, cause the computer to perform the wireless communication method according to the present disclosure.

According to another aspect of the present disclosure, a computer program is provided. The computer program, when executed by a computer, causes the computer to perform the wireless communication method according to the present disclosure.

Using an electronic device, a user equipment, a wireless communication method, and a computer readable storage medium according to the present disclosure, an electronic device on a network side may predict a best transmission beam at one or more time points based on historical information of a best transmission beam or historical information of channel state information, and the user equipment may predict a best reception beam at one or more time points based on historical information of a best reception beam or historical information of channel state information. In this way, it is not necessary to perform a beam training process frequently. Rather, the best transmission beam and the best reception beam are determined by means of prediction, thus reducing an overhead in the beam training process.

From the description provided herein, further areas of applicability will become apparent. The description and specific examples in the summary are only illustrative and are not intended to limit the scope of the present disclosure.

BRIEF DESCRIPTION OF THE DRAWINGS

The drawings described herein are for illustrating selected embodiments only rather than all possible implementations, and are not intended to limit the scope of the present disclosure. In the drawings.

Figure 1:
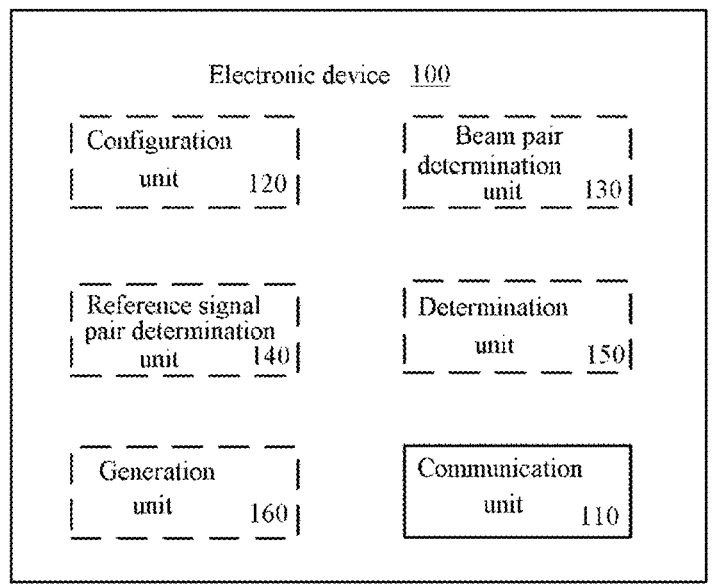
FIG. 1 is a block diagram showing an example of a configuration of an electronic device as a network side device according to an embodiment of a first aspect of the present disclosure.

Although various modifications and alternations are easily made to the present disclosure, specific embodiments of the present disclosure are shown in the drawings by examples, and are described in detail herein. It should be understood that description for the specific embodiments herein is not intended to limit the present disclosure to the specific form as disclosed. Instead, the present disclosure aims to cover all modifications, equivalents and alternations within the spirit and scope of the present disclosure. It is noted that throughout the drawings, corresponding reference numerals indicate corresponding parts.

DETAILED DESCRIPTION OF THE EMBODIMENTS

Examples of the present disclosure are fully disclosed with reference to the drawings. The following description is merely illustrative and is not intended to limit the present disclosure and applications or usage thereof.

Exemplary embodiments are provided, so that the present disclosure becomes thorough and the scope thereof is fully conveyed to those skilled in the art. Numerous specific details such as examples of specific components, devices and methods are set forth to provide a thorough understanding of embodiments of the present disclosure. It is apparent for those skilled in the art that, exemplary embodiments may be implemented in various ways without these specific details, which should not be constructed as limiting the scope of the present disclosure. In some exemplary embodiments, well-known processes, structures and technologies are not described in detail.

Description is made in the following order:

<I. First aspect>
1. Description of problems;
2. Configuration example of a network side device;
3. Configuration example of a user equipment;
4. Method embodiments;
<II. Second aspect>
1. Description of problems;
2. Configuration example of a network side device;
3. Configuration example of a user equipment;
4. Method embodiments;
<III. Application example>.

I. First Aspect

1. Description of Problems

As mentioned earlier, since the base station side may only transmit one beam in the same time-frequency resource, if the number of beams to be trained is large, a large overhead for beam training will be introduced.

Taking an SSB as an example, one SSB set includes L SSBs, and each SSB corresponds to one transmission beam. In the traditional beam training process, a network side device may transmit one SSB to a user equipment through one beam in each time slot. Thus it takes L time slots to complete the beam training for L SSBs in one SSB set. For different frequency bands, the number L of SSBs in each SSB set is different. For a lower frequency band (<3 GHz), L=4 may be supported at most. For a frequency band from 3 GHz to 6 GHz, L=8 may be supported at most. For a high frequency band, such as a FR2 frequency band>6 GHz, L=64 may be supported at most. It can be seen that with the increase of L, the overhead for the beam training process increases, especially in the high frequency band.

For such a scenario, an electronic device in a wireless communication system, a wireless communication method performed by an electronic device in a wireless communication system, and a computer readable storage medium are provided according to the present disclosure, to improve efficiency of a beam training process and reduce time consumption of the beam training process, thereby realizing a tradeoff between an overhead for beam training and a beamforming gain.

A wireless communication system according to the present disclosure may be a 5G New Radio (NR) communication system.

A network side device according to the present disclosure may be a base station device, for example, an eNB, or a base station (gNB) in the fifth generation communication system.

A user equipment according to the present disclosure may be a mobile terminal (such as a smartphone, a tablet personal computer (PC), a notebook PC, a portable game terminal, a portable/dongle-type mobile router, and a digital camera), or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the terminals described above.

2. Configuration Example of a Network Side Device

FIG. 1 is a block diagram showing an example of a configuration of an electronic device 100 according to an embodiment of the present disclosure. The electronic device 100 may be used as a network side device in a wireless communication system, and specifically may be used as a base station device in the wireless communication system.

As shown in FIG. 1, the electronic device 100 may include a communication unit 110.

Here, each unit of the electronic device 100 may be included in a processing circuit. It should be noted that the electronic device 100 may include one processing circuit or multiple processing circuits. Further, the processing circuit may include various discrete functional units to perform different functions and/or operations. It should be noted that these functional units may be physical entities or logical entities, and units with different names may be implemented by a same physical entity.

According to an embodiment of the present disclosure, the electronic device 100 may transmit two reference signals using a same time-frequency resource and using two beams in a beam pair, respectively, through the communication unit 110.

Here, a spatial distance between the two beams in the beam pair is greater than a predetermined value, and the two reference signals satisfy a predetermined constraint relationship.

It can be seen that, with the electronic device 100 according to an embodiment of the present disclosure, two reference signals satisfying a predetermined constraint relationship may be transmitted using a same time-frequency resource and using two beams with a spatial distance greater than a predetermined value, respectively. In this way, two beams may be transmitted at the same time in the same time-frequency resource, which can improve efficiency of a beam training process and reduce time consumption of the beam training process.

According to an embodiment of the present disclosure, the electronic device 100 may transmit a reference signal to a user equipment in coverage of the electronic device 100 through the communication unit 110 for beam training.

As shown in FIG. 1, according to an embodiment of the present disclosure, the electronic device 100 may further include a configuration unit 120 configured to configure various parameters in the beam training process, including but not limited to a beamforming parameter, a reference signal to be carried by each beam, a time-frequency resource used for transmitting each reference signal, and the like.

According to an embodiment of the present disclosure, as shown in FIG. 1, the electronic device 100 may further include a beam pair determination unit 130 configured to determine a beam pair. That is, the beam pair determination unit 130 may determine which two beams are in a same beam pair.

According to an embodiment of the present disclosure, the beam pair determination unit 130 may determine that a spatial distance between two beams in one beam pair is greater than a predetermined value. Here, a spatial distance between two beams may be expressed by the number of beams. For example, in a case that L=8 and beams are numbered from 1 to 8 in sequence, a spatial distance between beam 1 and beam 5 is 4 beams. According to an embodiment of the present disclosure, the beam pair determination unit 130 may determine that a spatial distance between two beams in one beam pair is greater than a predetermined number of beams (e.g., P beams).

Taking an i-th beam as an example, the beam pair determination unit 130 may determine that an (i+N)-th beam belongs to a same beam pair as the i-th beam, where i is greater than or equal to 1 and less than or equal to L−N, L is the total number of beams, and N is greater than P. For example, in a case of P=3 and L=8, the beam pair determination unit 130 may determine that N=4. In this case, a 1-st beam and a 5-th beam belong to one beam pair, a 2-nd beam and a 6-th beam belong to one beam pair, a 3-rd beam and a 7-th beam belong to one beam pair, and a 4-th beam and an 8-th beam belong to one beam pair.

According to an embodiment of the present disclosure, N may preferably be L/2. That is, an i-th beam and an (i+L/2)-th beam are located in a same beam pair.

Figure 2:
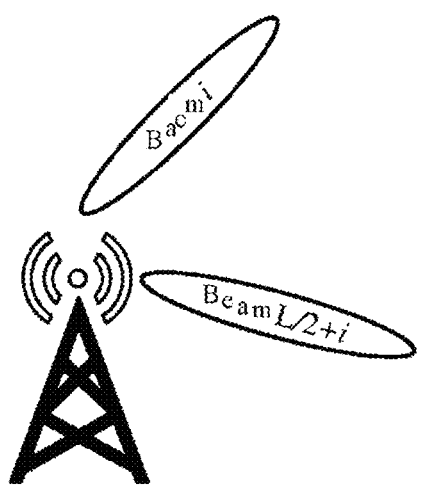
FIG. 2 is a schematic diagram showing a beam pair according to an embodiment of the present disclosure.

FIG. 2 is a schematic diagram showing a beam pair according to an embodiment of the present disclosure. As shown in FIG. 2, for a beam i, a beam L/2+i is located in a same beam pair with the beam i. FIG. 2 shows only one beam pair. Actually, all transmission beams of the electronic device 100 are divided into multiple beam pairs.

As described above, the electronic device 100 may transmit two reference signals at the same time and at the same frequency by using two beams with certain spatial isolation.

According to an embodiment of the present disclosure, as shown in FIG. 1, the electronic device 100 may further include a reference signal pair determination unit 140 configured to determine, for each beam pair, a reference signal pair for transmission through the two beams in the beam pair.

According to an embodiment of the present disclosure, two reference signals in a reference signal pair determined by the reference signal pair determination unit 140 satisfy a predetermined constraint relationship. Here, the predetermined constraint relationship may include: a product of a conjugate of a second reference signal of the two reference signals and a first reference signal of the two reference signals is a constant. Assuming that the first reference signal in the reference signal pair is 51 and the second reference signal is $s_2$, the constraint relationship is as follows:

$$s_1 s_2^* = C$$

In the formula, C is a constant and * represents a conjugate operation.

According to an embodiment of the present disclosure, the above constant may be a constant whose imaginary part is not 0. Preferably, the above constant may be a pure imaginary number (i.e. a constant whose real part is 0 and imaginary part is not 0). More preferably, the above constant may be j or −j. Here, j is a unit of imaginary number, i.e. j= $\sqrt{-1}$.

According to an embodiment of the present disclosure, the reference signal pair determination unit 140 may first generate a first reference signal in the reference signal pair. Here, the reference signal pair determination unit 140 may generate the first reference signal by using any existing reference signal generation method, which is not limited in the present disclosure. For example, the reference signal pair determination unit 140 may generate the first reference signal based on a sequence with a specific mathematical structure such as an M sequence or a ZC sequence.

According to an embodiment of the present disclosure, after the first reference signal is generated, the reference signal pair determination unit 140 may generate a second reference signal based on the predetermined constraint relationship and the first reference signal. For example, assuming that the constraint relationship is $s_1 s_2^* = j$, after a first reference signal sequence $r_1(m)$ is generated, the reference signal pair determination unit 140 may obtain a second reference signal sequence $r_2(m)$ based on the above constraint relationship, which is as follows:

$$r_2(m) = -j \frac{r_1(m)}{|r_1(m)|^2}$$

Here, m is an index of a reference signal sequence. Further, the reference signal pair determination unit 140 may determine the first reference signal sequence $r_1(m)$ as the first reference signal and the second reference signal sequence $r_2(m)$ as the second reference signal.

According to an embodiment of the present disclosure, the reference signal pair determination unit 140 may also perform normalization processing on the generated first reference signal and second reference signal. For example, the reference signal pair determination unit 140 may divide the generated first reference signal by a specific value and multiply the generated second reference signal by the specific value, so that the power of the first reference signal becomes smaller and the power of the second reference signal becomes larger, thereby avoiding that the power of the first reference signal is too large and the power of the second reference signal is too small. Preferably, the specific value may be a modulus value $|r_1(m)|$ of the generated first reference signal.

For example, after the first reference signal sequence $r_1(m)$ is generated, the reference signal pair determination unit 140 may perform the following normalization operation to obtain a final first reference signal $s_1(m)$:

$$s_1(m) = \frac{r_1(m)}{|r_1(m)|}$$

Further, after the second reference signal sequence $r_2(m)$ is generated, the reference signal pair determination unit 140 may perform the following normalization operation to obtain a final second reference signal $s_2(m)$:

$$s_2(m) = r_2(m)|r_1(m)| = -j\frac{r_1(m)}{|r_1(m)|}$$

As described above, according to the embodiment of the present disclosure, the reference signal pair determination unit 140 may generate the reference signal pair based on the predetermined constraint relationship.

According to an embodiment of the present disclosure, after each beam pair is determined by the beam pair determination unit 130 and each reference signal pair is determined by the reference signal pair determination unit 140, the configuration unit 120 may configure a reference signal to be carried for each beam.

According to an embodiment of the present disclosure, the configuration unit 120 may configure, for a first beam in a beam pair, a first reference signal in a reference signal pair and configure, for a second beam in the beam pair, a second reference signal in the reference signal pair. Alternatively, the configuration unit 120 may also configure, for a first beam in a beam pair, a second reference signal in a reference signal pair and configure, for a second beam in the beam pair, a first reference signal in the reference signal pair.

Figure 3:
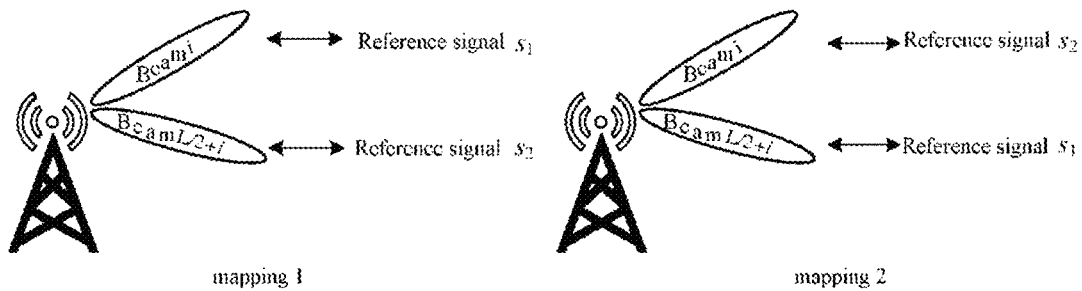
FIG. 3 is a schematic diagram showing a mapping relationship between a beam pair and a reference signal according to an embodiment of the present disclosure.

FIG. 3 is a schematic diagram showing a mapping relationship between a beam pair and a reference signal according to an embodiment of the present disclosure. As shown on a left side of FIG. 3, the configuration unit 120 may configure a reference signal 51 for a beam i and configure a reference signal $s_2$ for a beam L/2+i. As shown on a right side of FIG. 3, the configuration unit 120 may also configure the reference signal $s_2$ for the beam i and configure the reference signal $s_i$ for the beam L/2+i.

According to an embodiment of the present disclosure, two beams in each beam pair correspond to a same CSI-RS resource or correspond to a same SSB resource.

Figure 4:
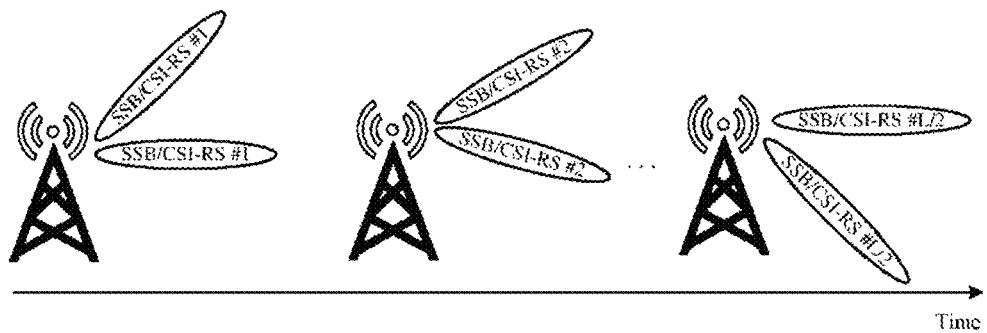
FIG. 4 is a schematic diagram showing a correspondence between a beam pair and a Channel State Information-Reference Signal (CSI-RS) resource/a Synchronization Signal Block (SSB) resource according to an embodiment of the present disclosure.

FIG. 4 is a schematic diagram showing a correspondence between a beam pair and a CSI-RS resource/an SSB resource according to an embodiment of the present disclosure. As shown in FIG. 4, two beams in a same beam pair correspond to a same CSI-RS resource or SSB resource. For example, two beams in a first beam pair correspond to an SSB/CSI-RS resource numbered 1, two beams in a second beam pair correspond to an SSB/CSI-RS resource numbered 2, ..., and two beams in an (L/2)-th beam pair correspond to an SSB/CSI-RS resource numbered L/2.

According to an embodiment of the present disclosure, the configuration unit 120 may configure a time-frequency resource used for transmitting each reference signal. In an embodiment, the configuration unit 120 may configure a same time-frequency resource for two reference signals in a reference signal pair, so that the configuration unit 120 may map the two reference signals generated by the reference signal pair generation unit 130 to the configured time-frequency resource.

Figure 5:
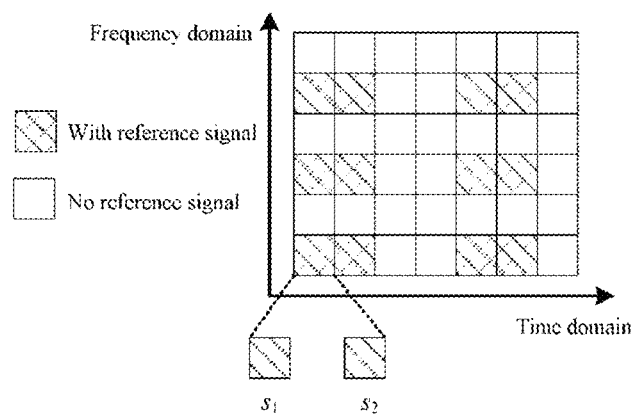
FIG. 5 is a schematic diagram showing a time-frequency resource for transmitting a reference signal pair using a beam pair according to an embodiment of the present disclosure.

FIG. 5 is a schematic diagram showing a time-frequency resource for transmitting a reference signal pair using a beam pair according to an embodiment of the present disclosure. As shown in FIG. 5, a horizontal axis represents a time domain resource, and a vertical axis represents a frequency domain resource. A first reference signal $s_1$ and a second reference signal $s_2$ in a reference signal pair are mapped to a same time domain resource and a same frequency domain resource.

That is, the electronic device 100 may transmit multiple downlink signals to a user equipment using multiple time-frequency resources respectively, each of the downlink signals including two reference signals transmitted using two beams.

As described above, according to the embodiment of the present disclosure, the electronic device 100 may transmit two reference signals satisfying the predetermined constraint relationship at the same time and at the same frequency by using two beams with certain spatial isolation. In the case that there is the certain spatial isolation between two beams in the beam pair and two reference signals in the reference signal pair satisfy the predetermined constraint relationship, although the same time-frequency resource is used to transmit the two reference signals, the two reference signals may be distinguished from each other on a user equipment side, which shortens time taken by beam training process and improves efficiency of beam training process.

The basic principle of the present disclosure will be described below.

Assuming that the electronic device 100, using a same time-frequency resource, transmits a reference signal $s_1$ using a beam 1 and transmits a reference signal $s_2$ using a beam 2, and the user equipment receives a downlink reference signal using a single antenna, a reception signal y on the user equipment side may be expressed as the following formula:

$$y = h^T b_1 s_1 + h^T b_2 s_2$$

In the formula, h represents a channel vector between the electronic device 100 and the user equipment. Here, it is assumed that the electronic device 100 generates two beams using a single antenna array. Thus, a channel vector between beam 1 and the user equipment is equal to a channel vector between beam 2 and the user equipment, both of which are $h_1$. T represents a transpose operation. $b_1$ represents a beamforming vector of beam 1, and $b_2$ represents a beamforming vector of beam 2. Further, the channel vector h may be expressed as the following formula:

$$h = \left[1, e^{-j\pi\cos\theta}, \ldots, e^{-j\pi(M-1)\cos\theta}\right]^T$$

In the formula, M represents the number of antenna elements of the electronic device 100, and θ represents a transmission angle of the user equipment, that is, an angle of a connecting line between the user equipment and the electronic device 100. It is noted that a channel model according to the present disclosure is made on an assumption that a distance between antennas is half wavelength. However, other antenna configurations are also applicable.

In addition, the beamforming vector $b_i$ (i=1 or 2) may be expressed as the following formula:

$$b_i = \frac{1}{\sqrt{M}}\left[1, e^{-j\pi\cos\theta_i}, \ldots, e^{-j\pi(M-1)\cos\theta_i}\right]^T$$

In the formula, M represents the number of antenna elements of the electronic device 100, and $\theta_i$ is a transmission angle of the beam i.

In the present disclosure, for ease of description, $h^T b_i$ is denoted as $q_i$, i.e., $q_i = h^T b_i$. Then in a case of $\theta \to \theta_i$, the following may be obtained:

$$\text{Im}(q_i) \to 0, |q_i| \to |\text{Re}(q_i)|$$

That is, if there is a beam with a transmission angle infinitely close to that of the user equipment in beam 1 and beam 2 (the beam should also be a beam with a best reception quality of the user equipment in theory), an imaginary part of a q value ($q_i$) of the beam is infinitely close to 0, that is, the q value of the beam may be approximately equal to a value of its real part. In other words, in a case that a transmission angle of a beam i is infinitely close to that of the user equipment, the power of beamforming is mainly concentrated on a real part of a training result of an i-th beam, while a power component of an imaginary part is close to zero.

In addition, if there is certain spatial isolation between beam 1 and beam 2, that is, $\theta_1$ and $\theta_2$ are far apart, and a transmission angle of a beam i in beam 1 and beam 2 is infinitely close to that of the user equipment, the following may be obtained:

$$|y| \to |q_i||s_i|$$

That is, in a case that beam 1 and beam 2 are far apart and there is a beam whose transmission angle is infinitely close to that of the user equipment, a reception signal of the user equipment mainly comes from a beam whose transmission angle is infinitely close to that of the user equipment, and is hardly affected by the other beam.

To sum up, in a case that beam 1 and beam 2 are far apart and there is an i-th beam whose transmission angle is infinitely close to that of the user equipment, a reception signal of the user equipment mainly comes from the beam whose transmission angle is infinitely close to that of the user equipment, and is hardly affected by the other beam. Moreover, the power of beamforming is mainly concentrated on a real part of a training result of the i-th beam, while a power component of an imaginary part is close to zero. Such a principle is adopted by the present disclosure, so that the electronic device 100 may transmit two reference signals at the same time and at the same frequency by using a beam pair with certain spatial isolation.

According to an embodiment of the present disclosure, the electronic device 100 may generate the two beams in the beam pair using a same antenna array. That is, the electronic device 100 may connect two radio frequency links using M antenna elements in one antenna array.

Figure 6:
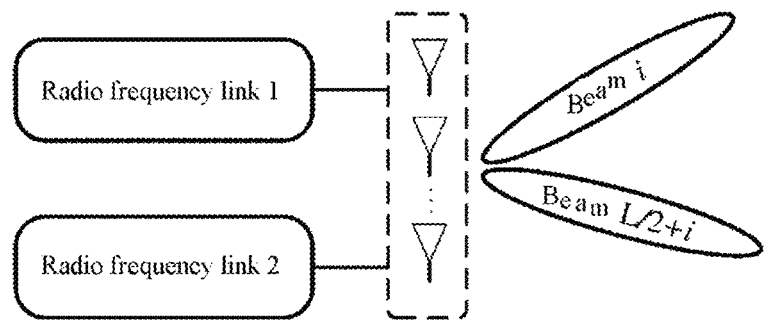
FIG. 6 is a schematic diagram showing a beam pair being generated using a same antenna array according to an embodiment of the present disclosure.

FIG. 6 is a schematic diagram showing a beam pair being generated using a same antenna array according to an embodiment of the present disclosure. As shown in FIG. 6, two radio frequency links may be connected by the same antenna array. Therefore, the electronic device 100 may generate two beams in a beam pair using the same antenna array.

According to an embodiment of the present disclosure, the electronic device 100 may also generate the two beams in the beam pair using two antenna arrays respectively. That is, the electronic device 100 may connect two radio frequency links using two antenna arrays, respectively.

Figure 7:
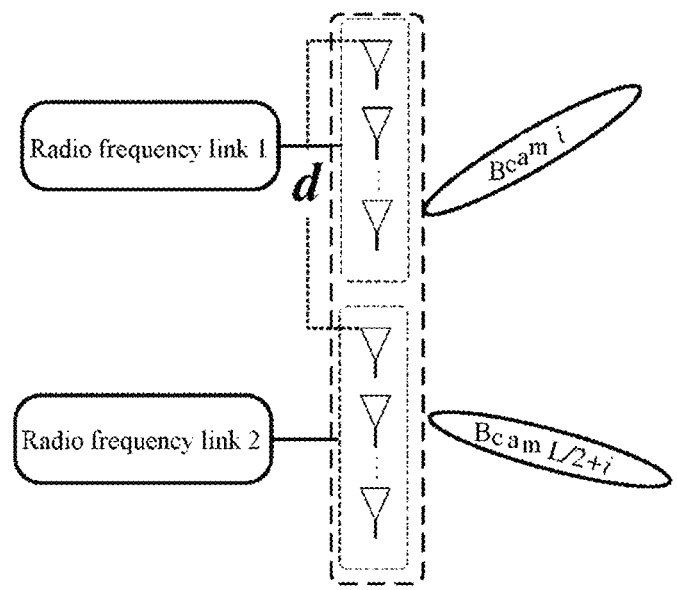
FIG. 7 is a schematic diagram showing a beam pair being generated using two antenna arrays according to an embodiment of the present disclosure.

FIG. 7 is a schematic diagram showing a beam pair being generated using two antenna arrays according to an embodiment of the present disclosure. As shown in FIG. 7, each of two antenna arrays may be connected to one radio frequency link. Therefore, the electronic device 100 may generate two beams in a beam pair using the two antenna arrays. In FIG. 7, d represents a distance between a first antenna element in a first antenna array and a first antenna element in a second antenna array.

According to an embodiment of the present disclosure, in a case that the electronic device 100 generates two beams in a beam pair using two antenna arrays respectively, the configuration unit 120 may perform phase compensation for at least one beam of the two beams based on a distance between the two antenna arrays when configuring a beamforming parameter.

In a case of generating two beams in a beam pair using one antenna array, a channel vector h between one of the two beams and the user equipment=is the same as a channel vector h between other one of the two beams and the user equipment. In a case of generating two beams in a beam pair using two antenna arrays, a channel vector between one of the two beams and the user equipment is different from a channel vector h between other one of the two beams and the user equipment. A channel vector between beam 1 and the user equipment is denoted as $h_1$, a channel vector between beam 2 and the user equipment is denoted as $h_2$, and a distance between a first antenna element in an antenna array where beam 2 is located and a first antenna element in an antenna array where beam 1 is located is denoted as d (the d may also be referred to as a distance between the two antenna arrays). Then, there is the following formula:

$$h_2 = e^{-j2\pi \frac{d}{\lambda} \cos\theta} h_1$$

In the formula, $\lambda$ represents a wavelength of a signal, and $\theta$ represents a transmission angle of the user equipment. A reception signal y of the user equipment may be expressed as the following formula:

$$y = h_1^T b_1 s_1 + h_2^T b_2 s_2 = h_1^T b_1 s_1 + e^{-j2\pi \frac{d}{\lambda} \cos\theta} h_1^T b_2 s_2$$

Therefore, phase compensation may be performed on a beamforming vector $b_2$ of beam 2 using $$e^{-j2\pi \frac{d}{\lambda} \cos\theta},$$

so that the compensated beamforming vector of beam 2 is a product of the original beamforming vector and $$e^{-j2\pi \frac{d}{\lambda} \cos\theta}.$$

In this way, the reception signal y in the case of multiple antenna arrays is similar to the reception signal y in the case of single antenna array described earlier in representation. That is, phase compensation may be performed on at least one beam of the two beams based on the distance between the two antenna arrays. Further, phase compensation may be performed on at least one beam of the two beams based on the distance between the two antenna arrays and the wavelength of the signal.

According to an embodiment of the present disclosure, as shown in FIG. 1, the electronic device 100 may further include a generation unit 160 configured to generate configuration information. The configuration information may include a first reference signal and a second reference signal of two reference signals, and the predetermined constraint relationship. Further, the electronic device 100 may transmit the configuration information to the user equipment through the communication unit 110, so that the user equipment may determine a beam with a best reception quality based on the first reference signal, the second reference signal and the constraint relationship.

According to an embodiment of the present disclosure, the configuration information may also include whether the beam training method according to the present disclosure, that is, the beam training method in which two reference signals are transmitted using a same time-frequency resource and using two beams, is adopted.

According to an embodiment of the present disclosure, for a case that a beam corresponds to an SSB resource, the electronic device 100 may adopt a cell-specific configuration mode, i.e., all user equipment in a cell served by the electronic device 100 have a same configuration. That is, the electronic device 100 may configure all user equipment in the cell to adopt the beam training method according to the present disclosure, or configure all user equipment in the cell not to adopt the beam training method according to the present disclosure. According to an embodiment of the present disclosure, for a case that the beam corresponds to a CSI-RS resource, the electronic device 100 may adopt a UE-specific configuration mode, i.e., user equipment in a cell served by the electronic device 100 may have different configurations. That is, the electronic device 100 may configure some user equipment in the cell to adopt the beam training method according to the present disclosure, and configure some user equipment in the cell not to adopt the beam training method according to the present disclosure (for example, adopt the traditional beam training method).

According to an embodiment of the present disclosure, the electronic device 100 may transmit the configuration information to the user equipment in a broadcast manner through cell necessary information. Optionally, the electronic device 100 may also transmit the configuration information to the user equipment through signaling such as Downlink Control Information (DCI).

According to an embodiment of the present disclosure, the electronic device 100 may also receive feedback information from the user equipment through the communication unit 110.

As shown in FIG. 1, the electronic device 100 may further include a determination unit 150. According to an embodiment of the present disclosure, the determination unit 150 may determine a beam with a best reception quality measured by the user equipment based on the received feedback information.

According to an embodiment of the present disclosure, the feedback information may include an identification of a CSI-RS resource or an SSB resource. In the present disclosure, since two beams in a same beam pair correspond to a same CSI-RS resource or SSB resource, the determination unit 150 may determine a beam pair to which the beam with the best reception quality belongs based on the identification of the CSI-RS resource or the SSB resource in the feedback information.

According to an embodiment of the present disclosure, the feedback information may also include an identification of a reference signal. In the present disclosure, since two beams in a same beam pair carry different reference signals, the determination unit 150 may determine the beam with the best reception quality from the beam pair to which the beam with the best reception quality belongs based on the identification of the reference signal in the feedback information. In an embodiment, the determination unit 150 may determine a beam corresponding to an identification of a reference signal included in the feedback information as the beam with the best reception quality based on a correspondence between the reference signal and the beam. In an example, the feedback information may include an identification of a reference signal of 1 bit. The identification of the reference signal as 0 indicates the first reference signal, while the identification of the reference signal as 1 indicates the second reference signal.

According to an embodiment of the present disclosure, a process of determining a beam pair by the beam pair determination unit 130 is transparent to the user equipment. That is, the user equipment does not know two beams in the beam pair. In addition, a process of configuring reference signals for each beam pair by the configuration unit 120 is also transparent to the user equipment. That is, the user equipment does not know a correspondence between the beam and the reference signal. The user equipment only knows which reference signal corresponds to the beam with the best reception quality. Therefore, an identification of the reference signal may be included in the feedback information, so that the determination unit 150 may determine the beam with the best reception quality measured by the user equipment based on the correspondence between the reference signal and the beam.

According to an embodiment of the present disclosure, the feedback information may further include reception quality information of the beam pair where the beam with the best reception quality is located, thereby the determination unit 150 may determine a reception quality of the beam pair where the beam with the best reception quality is located based on the reception quality information included in the feedback information. According to an embodiment of the present disclosure, since two beams in a same beam pair transmit two signals using a same time-frequency resource, a reception quality measured by the user equipment is the reception quality of the beam pair. Here, the reception quality may be expressed by various parameters, such as Reference Signal Receiving Power (RSRP), which is not limited in the present disclosure. In addition, as mentioned above, in the case that there is a certain isolation between two beams in a beam pair, the reception signal for the beam pair mainly comes from a beam with a best channel quality, and is hardly affected by the other beam. Therefore, although the feedback information includes a channel quality of the beam pair, a difference between the channel quality of the beam pair and the channel quality of the beam with the best reception quality may be ignored.

As described above, according to the embodiment of the present disclosure, the electronic device 100 may determine the beam with the best reception quality measured by the user equipment through a determination result of the determination unit 150, to achieve the purpose of beam training.

Figure 8:
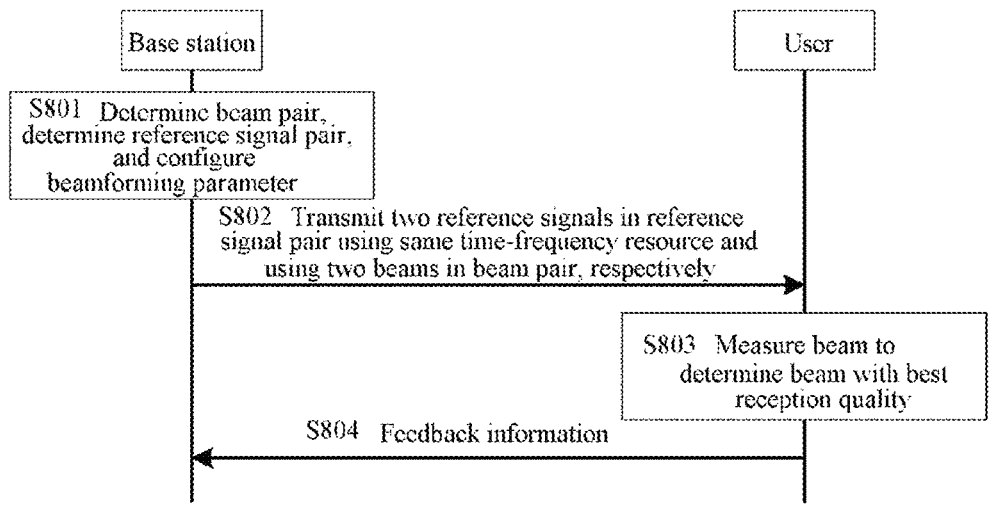
FIG. 8 is a flowchart showing signaling of a beam training process according to an embodiment of the present disclosure.

FIG. 8 is a flowchart showing signaling of a beam training process according to an embodiment of the present disclosure. In FIG. 8, a base station may be implemented by the electronic device 100. As shown in FIG. 8, in step S801, the base station divides multiple beams into a beam pair, determines a reference signal pair satisfying a predetermined constraint relationship, and configures a beamforming parameter based on the beam pair and the reference signal pair. Next, in step S802, the base station transmits two reference signals in the reference signal pair using a same time-frequency resource and using two beams in the beam pair, respectively. Next, in step S803, user equipment performs beam measurement to determine a beam with a best reception quality. Next, in step S804, the user equipment transmits feedback information of beam training to the base station. Therefore, the process of beam training may be realized, the time taken by beam training is shortened, and the efficiency of beam training is improved.

It can be seen that, with the electronic device 100 according to the embodiment of the present disclosure, a reference signal pair satisfying a certain constraint relationship may be transmitted at the same time and at the same frequency by using a beam pair with certain spatial isolation, thereby saving the time taken by beam training and improving the efficiency of beam training. In addition, the electronic device 100 may configure a beam training process for user equipment or for a cell. Further, the electronic device 100 may determine a beam with a best reception quality measured by the user equipment through feedback information received from the user equipment, to achieve the purpose of beam training. To sum up, with the electronic device 100 according to the embodiment of the present disclosure, a tradeoff between an overhead for beam training and a beamforming gain can be realized.

3. Configuration Example of a User Equipment

Figure 9:
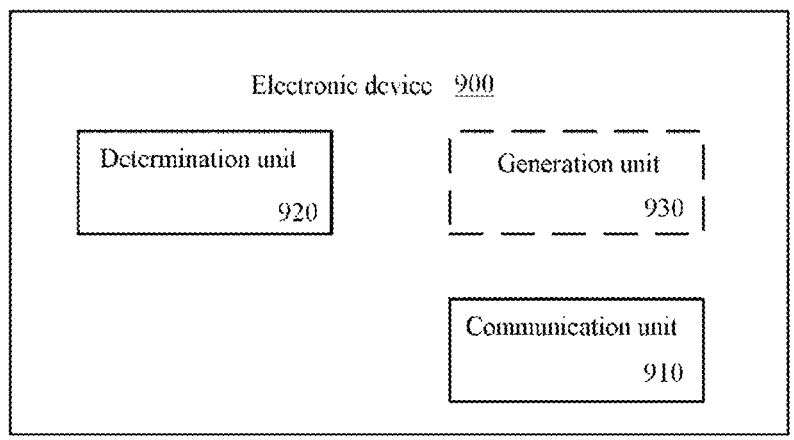
FIG. 9 is a block diagram showing an example of a configuration of an electronic device as a user equipment according to an embodiment of the present disclosure.

FIG. 9 is a block diagram showing a structure of an electronic device 900 as a user equipment in a wireless communication system according to an embodiment of the present disclosure.

As shown in FIG. 9, the electronic device 900 may include a communication unit 910 and a determination unit 920.

Here, each unit of the electronic device 900 may be included in a processing circuit. It should be noted that the electronic device 900 may include one processing circuit or multiple processing circuits. Further, the processing circuit may include various discrete functional units to perform different functions and/or operations. It should be noted that these functional units may be physical entities or logical entities, and units with different names may be implemented by a same physical entity.

According to an embodiment of the present disclosure, the electronic device 900 may receive multiple downlink signals through the communication unit 910. Here, each of the downlink signals includes two reference signals transmitted using a same time-frequency resource and using two beams, respectively. A spatial distance between the two beams is greater than a predetermined value, and the two reference signals satisfy a predetermined constraint relationship.

According to an embodiment of the present disclosure, the determination unit 920 may determine a downlink signal with a best reception quality from the multiple downlink signals.

According to an embodiment of the present disclosure, the determination unit 920 may further determine a beam with a best reception quality from the two beams carrying the downlink signal with the best reception quality.

As described above, with the electronic device 900 according to the embodiment of the present disclosure, multiple downlink signals may be received, and each of the downlink signals includes two reference signals satisfying a predetermined constraint relationship and transmitted at the same time and at the same frequency by using two beams with certain spatial isolation, respectively. The electronic device 900 may first determine a downlink signal with a best reception quality and then determine a beam with a best reception quality. In this way, the time taken by a beam training process can be greatly reduced and efficiency of the beam training process can be improved.

According to an embodiment of the present disclosure, the electronic device 900 may receive the multiple downlink signals from a network side device. A process of generating multiple downlink signals by the network side device has been described in detail in the foregoing, which is not repeated here.

According to an embodiment of the present disclosure, the determination unit 920 may measure a reception quality of each downlink signal, and determine a downlink signal with a best reception quality from the multiple downlink signals. Here, the reception quality may be expressed by various parameters, such as Reference Signal Receiving Power (RSRP), which is not limited in the present disclosure. For example, the determination unit 920 may determine an RSRP value of each downlink signal, and determine a downlink signal with a largest RSRP value as the downlink signal with the best reception quality. Further, since the downlink signal with the best reception quality includes two reference signals transmitted by two beams, the determination unit 920 is further required to distinguish the two beams.

According to an embodiment of the present disclosure, the determination unit 920 may generate a first comparison signal based on the downlink signal with the best reception quality and a first reference signal of the two reference signals, generate a second comparison signal based on the downlink signal with the best reception quality and a second reference signal of the two reference signals, and determine the beam with the best reception quality based on the first comparison signal and the second comparison signal.

In an embodiment, the determination unit 920 may generate a first comparison signal based on a product of a conjugate of a first reference signal and the downlink signal with the best reception quality, and generate a second comparison signal based on a product of a conjugate of a second reference signal and the downlink signal with the best reception quality.

For example, assuming that the downlink signal with the best reception quality is y, the first reference signal is $s_1$, and the second reference signal is $s_2$, the determination unit 920 may determine the first comparison signal $r_1$ and the second comparison signal $r_2$ from the following formula:

$$r_1 = y s_1^* = q_1 + q_2 s_2 s_1^*$$

$$r_2 = y s_2^* = q_1 s_1 s_2 + q_2$$

In the formula, $q_1 = h^T b_1$ and $q_2 = h^T b_2$. h represents a channel vector between the network side device and the electronic device 900. $b_1$ represents a beamforming vector of beam 1, and $b_2$ represents a beamforming vector of beam 2.

Further, according to an embodiment of the present disclosure, the determination unit 920 may determine the beam with the best reception quality based on the first comparison signal and the second comparison signal. As mentioned above, the first reference signal and the second reference signal satisfy the predetermined constraint relationship, specifically, a product of a conjugate of the second reference signal and the first reference signal is a constant. Therefore, both the first comparison signal and the second comparison signal may be represented by $q_1$ and $q_2$, which is irrelevant to the first reference signal and the second reference signal.

According to an embodiment of the present disclosure, the determination unit 920 may determine the beam with the best reception quality based on a real part or an imaginary part of the first comparison signal and a real part or an imaginary part of the second comparison signal. A determination process by the determination unit 920 is illustrated below by using two non-limiting examples.

Assuming that the product of the conjugate of the second reference signal and the first reference signal is a constant, neither a real part nor an imaginary part of which is 0, there is $s_1 s_2^* = a + bi$, where neither a nor b is 0. Thus the first comparison signal $r_1$ and the second comparison signal $r_2$ are as follows:

$$r_1 = q_1 + q_2(a - bi) = q_1 + q_2 a - q_2 bi$$

$$r_2 = q_1(a + bi) + q_2 = q_1 a + q_1 bi + q_2$$

As mentioned earlier, in a case that beam 1 and beam 2 are far apart and there is an i-th beam whose transmission angle is infinitely close to that of the user equipment, a reception signal of the user equipment mainly comes from the beam whose transmission angle is infinitely close to that of the user equipment, and is hardly affected by the other beam. Moreover, the power of beamforming is mainly concentrated on a real part of a training result of the i-th beam, while a power component of an imaginary part is close to zero.

That is, if a transmission angle of beam 1 is infinitely close to that of the user equipment, that is, beam 1 is the beam with the best reception quality, then $\text{Im}(q_1) \to 0$ and $q_2 \to 0$, and thus $\text{Im}(r_1) \to 0$ may be obtained. If a transmission angle of beam 2 is infinitely close to that of the user equipment, that is, beam 2 is the beam with the best reception quality, then $\text{Im}(q_2) \to 0$ and $q_1 \to 0$, and thus $\text{Im}(r_2) \to 0$ may be obtained.

That is, the determination unit 920 may determine the beam with the best reception quality based on the imaginary part of the first comparison signal and the imaginary part of the second comparison signal. In an embodiment, in a case that the imaginary part of the first comparison signal is close to 0, the determination unit 920 may determine that a beam carrying the first reference signal is the beam with the best reception quality. In a case that the imaginary part of the second comparison signal is close to 0, the determination unit 920 may determine that a beam carrying the second reference signal is the beam with the best reception quality.

In the present disclosure, whether a real part and/or an imaginary part of a signal are close enough to 0 may be determined based on any well-known method. For example, whether a real part and/or an imaginary part are close to 0 may be judged by judging whether a difference between the real part and/or the imaginary part and 0 is less than a predetermined value, which is not limited in the present disclosure.

As described above, in the case that the product of the conjugate of the second reference signal and the first reference signal is a constant, neither a real part nor an imaginary part of which is 0, the determination unit 920 may determine the beam with the best reception quality only by the imaginary part of the first comparison signal and the imaginary part of the second comparison signal. Further, according to an embodiment of the present disclosure, in order to simplify an operation of the determination unit 920 and further improve an accuracy of the determination, the product of the conjugate of the second reference signal and the first reference signal may also be set as a pure imaginary number, i.e., $s_1 s_2^* = ci$, where c is not 0 (preferably, c=1 or −1). Therefore, the first comparison signal $r_1$ and the second comparison signal $r_2$ are as follows:

$$r_1 = q_1 - q_2 ci$$

$$r_2 = q_1 ci + q_2$$

If a transmission angle of beam 1 is infinitely close to that of the user equipment, that is, beam 1 is the beam with the best reception quality, then $Im(q_1) \to 0$ and $q_2 \to 0$, and thus $Im(r_1) \to 0$ and $Re(r_2) \to 0$ may be obtained. If a transmission angle of beam 2 is infinitely close to that of the user equipment, that is, beam 2 is the beam with the best reception quality, then $Im(q_2) \to 0$ and $q_1 \to 0$, and thus $Im(r_2) \to 0$ and $Re(r_1) \to 0$ may be obtained.

That is, the determination unit 920 may determine the beam with the best reception quality based on the imaginary part and the real part of the first comparison signal and the imaginary part and the real part of the second comparison signal. In an embodiment, in a case that the imaginary part of the first comparison signal is close to 0 and the real part of the second comparison signal is close to 0, the determination unit 920 may determine that a beam carrying the first reference signal is the beam with the best reception quality. In a case that the imaginary part of the second comparison signal is close to 0 and the real part of the first comparison signal is close to 0, the determination unit 920 may determine that a beam carrying the second reference signal is the beam with the best reception quality. Therefore, the determination unit 920 may determine the beam with the best reception quality by the real part and the imaginary part of the first comparison signal in connection with the real part and the imaginary part of the second comparison signal, thereby improving the accuracy of the determination.

According to an embodiment of the present disclosure, the electronic device 900 may also receive configuration information through the communication unit 910. The configuration information includes a first reference signal and a second reference signal of the two reference signals, and the predetermined constraint relationship. In this way, the electronic device 900 may generate a first comparison signal and a second comparison signal based on the first reference signal, the second reference signal and the predetermined constraint relationship included in the configuration information.

According to an embodiment of the present disclosure, the electronic device 900 may further determine whether to adopt the beam training method according to the present disclosure through configuration information, that is, the beam training method in which two reference signals are transmitted using a same time-frequency resource and using two beams.

According to an embodiment of the present disclosure, the electronic device 900 may receive the configuration information through cell necessary information broadcast. Optionally, the electronic device 900 may also receive the configuration information through signaling such as Downlink Control Information (DCI).

According to an embodiment of the present disclosure, as shown in FIG. 9, the electronic device 900 may further include a generation unit 930 configured to generate feedback information including a result of the beam training process.

According to an embodiment of the present disclosure, the feedback information generated by the generation unit 930 may include an identification of a CSI-RS resource or a Synchronization Signal Block, SSB, resource corresponding to the two beams carrying the downlink signal with the best reception quality. In the present disclosure, two beams in a same beam pair correspond to a same CSI-RS resource or SSB resource. The electronic device 900 does not know beam information in the beam pair, and may only determine which CSI-RS resource or SSB resource corresponds to the beam pair with the best reception quality. Therefore, the feedback information may include the identification of the CSI-RS resource or the Synchronization Signal Block, SSB, resource corresponding to the two beams carrying the downlink signal with the best reception quality. For example, the feedback information may include a CSI-RS Resource Indicator (CRI) or an SSB Resource Indicator (SSBRI).

According to an embodiment of the present disclosure, the feedback information generated by the generation unit 930 may further include an identification of a reference signal carried by the beam with the best reception quality. In the present disclosure, the electronic device 900 does not know a correspondence between the beam and the reference signal. However, the determination unit 920 of the electronic device 900 may determine which reference signal is carried by the beam with the best reception quality based on the above method. Therefore, the generation unit 930 may include the identification of the reference signal carried by the beam with the best reception quality in the feedback information. For example, the generation unit 930 may include information of 1 bit in the feedback information to indicate an identification of a reference signal. Information as 0 indicates the first reference signal, while information as 1 indicates the second reference signal.

According to an embodiment of the present disclosure, the feedback information generated by the generation unit 930 may further include reception quality information of the downlink signal with the best reception quality, such as an RSRP value.

As described above, with the electronic device 900 according to the embodiment of the present disclosure, multiple downlink signals may be received, and each of the downlink signals includes two reference signals satisfying a predetermined constraint relationship and transmitted at the same time and at the same frequency by using two beams with certain spatial isolation, respectively. The electronic device 900 may first determine a downlink signal with a best reception quality, and then generate a first comparison signal and a second comparison signal to determine a beam with a best reception quality. In this way, the time taken by a beam training process can be greatly reduced and the efficiency of the beam training process can be improved. In addition, the electronic device 900 may further generate feedback information, so that the beam with the best reception quality may be fed back.

According to an embodiment of the present disclosure, the electronic device 100 may serve as the network side device, and the electronic device 900 may serve as the user equipment. That is, the electronic device 100 may provide a service for the electronic device 900, and thus all embodiments regarding the electronic device 100 described above are applicable hereto.

4. Method Embodiments

Hereinafter, a wireless communication method performed by an electronic device 100 as a network side device in a wireless communication system according to an embodiment of the present disclosure is described in detail.

Figure 10:
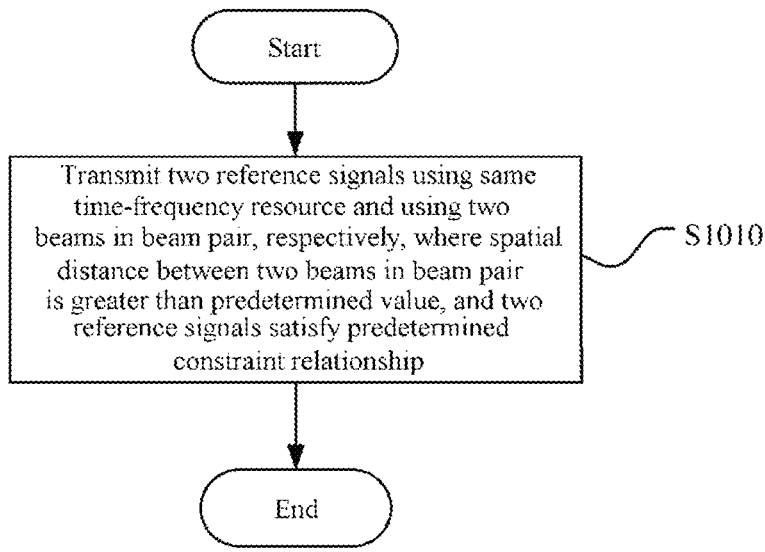
FIG. 10 is a flowchart showing a wireless communication method performed by an electronic device according to an embodiment of the present disclosure.

FIG. 10 is a flowchart showing a wireless communication method performed by an electronic device 100 as a network side device in a wireless communication system according to an embodiment of the present disclosure.

As shown in FIG. 10, in step S1010, two reference signals are transmitted using a same time-frequency resource and using two beams in a beam pair, respectively, where a spatial distance between the two beams in the beam pair is greater than a predetermined value, and the two reference signals satisfy a predetermined constraint relationship.

Preferably, the wireless communication method further includes a step of determining the beam pair, which includes: for an i-th beam, determining that an (i+N)-th beam belongs to a same beam pair as the i-th beam, where i is greater than or equal to 1 and less than or equal to L−N, and L is the total number of beams.

Preferably, the predetermined constraint relationship includes: a product of a conjugate of a second reference signal of the two reference signals and a first reference signal of the two reference signals is a constant.

Preferably, the wireless communication method further includes a step of generating the two reference signals, which includes: generating a first reference signal of the two reference signals; and generating a second reference signal of the two reference signals based on the predetermined constraint relationship and the first reference signal.

Preferably, the transmitting two reference signals includes: transmitting a first reference signal of the two reference signals using a first beam in the beam pair, and transmitting a second reference signal of the two reference signals using a second beam in the beam pair; or transmitting a second reference signal of the two reference signals using a first beam in the beam pair, and transmitting a first reference signal of the two reference signals using a second beam in the beam pair.

Preferably, two beams in each beam pair correspond to a same Channel State Information-Reference Signal, CSI-RS, resource or correspond to a same Synchronization Signal Block, SSB, resource.

Preferably, the wireless communication method further includes: receiving feedback information; and determining a beam with a best reception quality based on the feedback information.

Preferably, the determining a beam with a best reception quality includes: determining, based on an identification of a Channel State Information-Reference Signal, CSI-RS, resource or a Synchronization Signal Block, SSB, resource in the feedback information, a beam pair to which the beam with the best reception quality belongs; and determining, based on an identification of a reference signal in the feedback information, the beam with the best reception quality from the beam pair to which the beam with the best reception quality belongs.

Preferably, the wireless communication method further includes: transmitting configuration information, where the configuration information includes a first reference signal and a second reference signal of the two reference signals, and the predetermined constraint relationship.

Preferably, the wireless communication method further includes: generating the two beams in the beam pair using a same antenna array; or generating the two beams in the beam pair using two antenna arrays respectively, and performing phase compensation for at least one beam of the two beams based on a distance between the two antenna arrays.

According to an embodiment of the present disclosure, a subject that performs the above method may be the electronic device 100 according to the embodiments of the present disclosure, so all the previous embodiments regarding the electronic device 100 are applicable herein.

Hereinafter, a wireless communication method performed by an electronic device 900 as a user equipment in a wireless communication system according to an embodiment of the present disclosure is described in detail.

Figure 11:
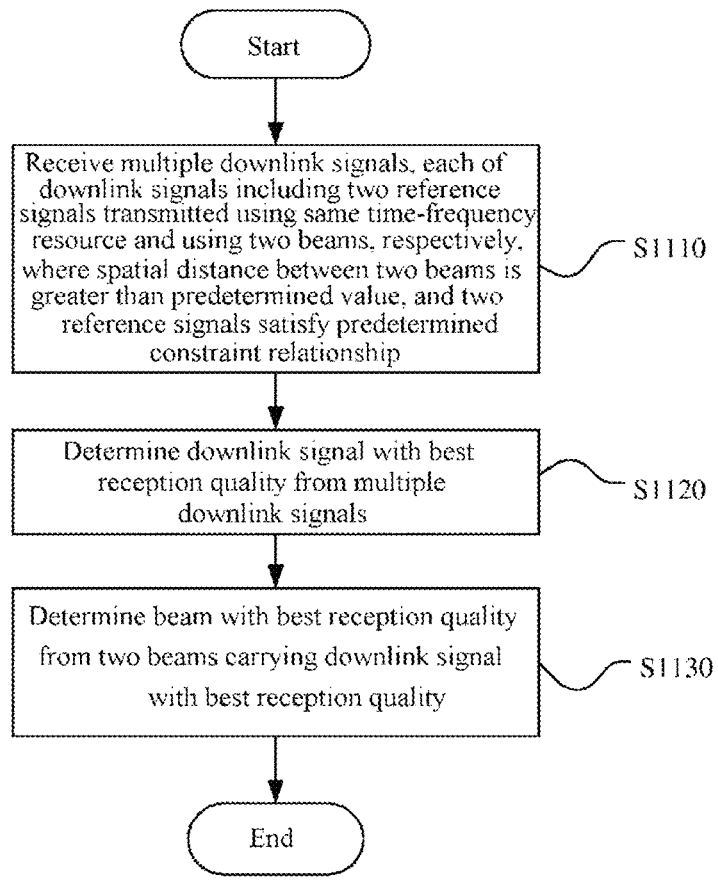
FIG. 11 is a flowchart showing a wireless communication method performed by an electronic device according to another embodiment of a first aspect of the present disclosure.

FIG. 11 is a flowchart showing a wireless communication method performed by an electronic device 900 as a user equipment in a wireless communication system according to an embodiment of the present disclosure.

As shown in FIG. 11, in step S1110, multiple downlink signals are received, each of the downlink signals including two reference signals transmitted using a same time-frequency resource and using two beams, respectively, where a spatial distance between the two beams is greater than a predetermined value, and the two reference signals satisfy a predetermined constraint relationship.

Next, in step S1120, a downlink signal with a best reception quality is determined from the multiple downlink signals.

Next, in step S1130, a beam with a best reception quality is determined from the two beams carrying the downlink signal with the best reception quality.

Preferably, the determining a beam with a best reception quality includes: generating a first comparison signal based on the downlink signal with the best reception quality and a first reference signal of the two reference signals; generating a second comparison signal based on the downlink signal with the best reception quality and a second reference signal of the two reference signals; and determining the beam with the best reception quality based on the first comparison signal and the second comparison signal.

Preferably, the determining the beam with the best reception quality includes: determining the beam with the best reception quality based on a real part or an imaginary part of the first comparison signal and a real part or an imaginary part of the second comparison signal.

Preferably, the wireless communication method further includes: generating feedback information, where the feedback information includes an identification of a Channel State Information-Reference Signal, CSI-RS, resource or a Synchronization Signal Block, SSB, resource corresponding to the two beams carrying the downlink signal with the best reception quality, and an identification of a reference signal carried by the beam with the best reception quality.

Preferably, the feedback information further includes reception quality information of the downlink signal with the best reception quality.

Preferably, the wireless communication method further includes: receiving configuration information, where the configuration information includes a first reference signal and a second reference signal of the two reference signals, and the predetermined constraint relationship.

According to an embodiment of the present disclosure, a subject that performs the above method may be the electronic device 900 according to the embodiments of the present disclosure, so all the previous embodiments regarding the electronic device 900 are applicable herein.

II. Second Aspect

1. Description of Scenarios

As mentioned above, as the user equipment moves, the base station is required to periodically perform a beam training process with the user equipment to update a best transmission beam and a best reception beam. In a scenario in which the user equipment is moving at a high speed, the base station is required to reduce a cycle of beam training process to update a best transmission beam and a best reception beam in time. For example, a cycle of beam training process may be 20 ms. That is, the beam training process is required to be performed between the base station and the user equipment every 20 ms, which increases an overhead for beam training.

For such a scenario, a network side device and user equipment in a wireless communication system, a wireless communication method performed by a network side device in a wireless communication system, a wireless communication method performed by user equipment in a wireless communication system, and a computer readable storage medium are provided according to the present disclosure, to reduce an overhead in a beam training process.

The wireless communication system according to the present disclosure may be a 5G New Radio (NR) communication system.

The network side device according to the present disclosure may be a base station device, for example, an eNB, or a base station (gNB) in the fifth generation communication system.

The user equipment according to the present disclosure may be a mobile terminal (such as a smartphone, a tablet personal computer (PC), a notebook PC, a portable game terminal, a portable/dongle-type mobile router, and a digital camera), or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the terminals described above.

According to an embodiment of the present disclosure, the network side device and the user equipment may communicate through a high-frequency link, which includes but is not limited to a millimeter wave antenna. Optionally, the network side device and the user equipment may also communicate through a high-frequency link and a low-frequency link. For example, a millimeter wave antenna as the high-frequency link is deployed on a low-frequency network side device, and then the high-frequency link and the low-frequency link have similar spatial features. A predicted best transmission beam and a predicted best reception beam described below are also a best transmission beam and a best reception beam for the high-frequency link, respectively.

2. Configuration Example of a Network Side Device

Figure 12:
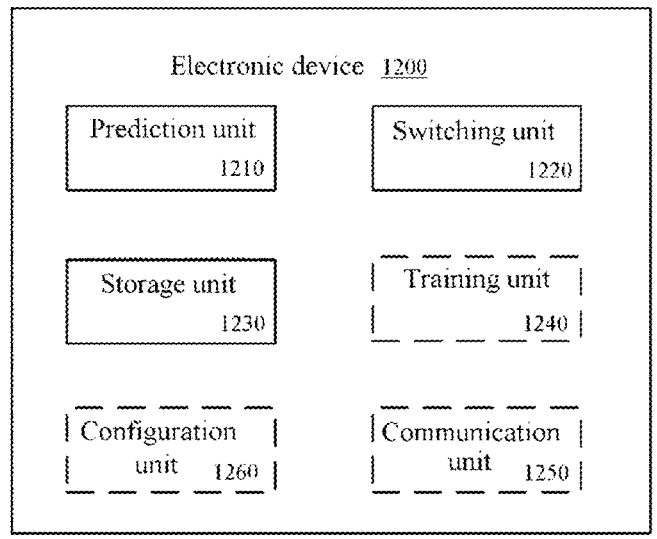
FIG. 12 is a block diagram showing an example of a configuration of an electronic device as a network side device according to an embodiment of a second aspect of the present disclosure.

FIG. 12 is a block diagram showing an example of a configuration of an electronic device 1200 according to an embodiment of the present disclosure. The electronic device 1200 may be used as a network side device in a wireless communication system, and specifically may be used as a base station device in the wireless communication system.

As shown in FIG. 12, the electronic device 1200 may include a prediction unit 1210, a switching unit 1220 and a storage unit 1230.

Here, each unit of the electronic device 1200 may be included in a processing circuit. It should be noted that the electronic device 1200 may include one processing circuit or multiple processing circuits. Further, the processing circuit may include various discrete functional units to perform different functions and/or operations. It should be noted that these functional units may be physical entities or logical entities, and units with different names may be implemented by a same physical entity.

According to an embodiment of the present disclosure, the prediction unit 1210 may predict a best transmission beam of the electronic device 1200 at one or more time points based on historical information of a best transmission beam of the electronic device 1200 or historical information of channel state information of a channel between the electronic device 1200 and a user equipment.

Here, the user equipment may be a user equipment in coverage of the electronic device 1200, and the predicted best transmission beam is also a best transmission beam for the user equipment.

According to an embodiment of the present disclosure, the storage unit 1230 may store the historical information of the best transmission beam of the electronic device 1200 and/or the historical information of the channel state information of the channel between the electronic device 1200 and the user equipment.

According to an embodiment of the present disclosure, the switching unit 1220 may perform beam switching based on the predicted best transmission beam of the electronic device 1200 at the one or more time points.

Here, the switching unit 1220 may perform beam switching in a case that beam switching is required. For example, if a predicted best transmission beam at a certain time point is the same as a predicted best transmission beam at a previous time point, the switching unit 1220 may determine that beam switching is not required at this time point. If a predicted best transmission beam at a certain time point is different from a predicted best transmission beam at a previous time point, the switching unit 1220 may determine that beam switching is required at this time point.

As described above, with the electronic device 1200 according to the embodiment of the present disclosure, a best transmission beam at one or more time points may be predicted based on historical information of a best transmission beam or historical information of channel state information. In this way, it is not necessary to perform a beam training process frequently. Rather, the best transmission beam is determined by means of prediction, thus reducing an overhead in the beam training process.

According to an embodiment of the present disclosure, the electronic device 1200 may communicate with the user equipment using a high-frequency link. Here, the electronic device 1200 may predict the best transmission beam using information on the high-frequency link. In addition, according to an embodiment of the present disclosure, in a case that the electronic device 1200 communicates with the user equipment using a high-frequency link and a low-frequency link, the electronic device 1200 may predict the best transmission beam using information on the high-frequency link, and may also predict the best transmission beam using information on the low-frequency link. These two cases will be described in detail below.

<The Electronic Device 1200 Predicting the Best Transmission Beam Using Information on the High-Frequency Link>

According to an embodiment of the present disclosure, the information on the high-frequency link may include the historical information of the best transmission beam. That is, the prediction unit 1210 may predict the best transmission beam of the electronic device 1200 at the one or more time points based on the historical information of the best transmission beam of the electronic device 1200.

According to an embodiment of the present disclosure, information on the high-frequency link may further include historical information of a reception quality of a transmission beam adjacent to the best transmission beam of the electronic device 1200. That is, the prediction unit 1210 may predict the best transmission beam of the electronic device 1200 at the one or more time points based on the historical information of the best transmission beam of the electronic device 1200 and the historical information of the reception quality of the transmission beam adjacent to the best transmission beam of the electronic device 1200.

In the present disclosure, the transmission beam adjacent to the best transmission beam of the electronic device 1200 includes a transmission beam whose spatial distance from the best transmission beam is within a predetermined range. Here, the spatial distance between the two beams may be expressed by the number of beams by which the two beams differ. For example, in a case that transmission beams of the electronic device 1200 are numbered in sequence, a spatial distance between a transmission beam numbered 1 and a transmission beam numbered 3 is 2 transmission beams. The predetermined range may be, for example, n transmission beams, where n is a positive integer. In a case of n=1, the transmission beam adjacent to the best transmission beam of the electronic device 1200 includes a transmission beam whose spatial distance from the best transmission beam is within 1 transmission beam. In a case of n=2, the transmission beam adjacent to the best transmission beam of the electronic device 1200 includes a transmission beam whose spatial distance from the best transmission beam is within 2 transmission beams, and so on.

Figure 13:
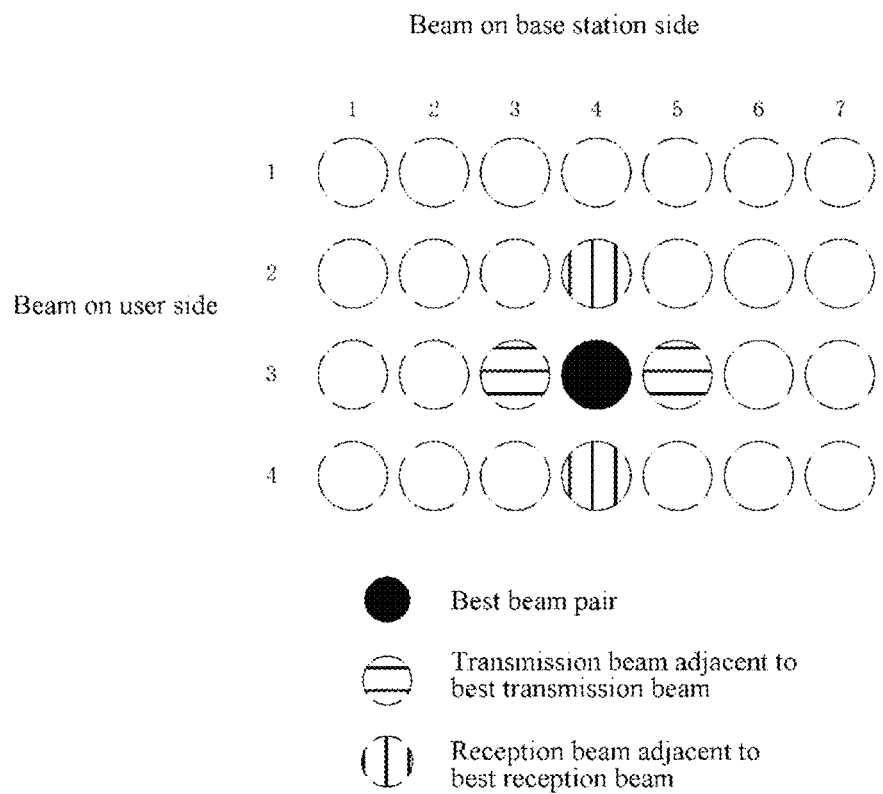
FIG. 13 is a schematic diagram showing an adjacent transmission beam and an adjacent reception beam according to an embodiment of the present disclosure.

FIG. 13 is a schematic diagram showing an adjacent transmission beam and an adjacent reception beam according to an embodiment of the present disclosure. As shown in FIG. 13, transmission beams on a base station side are numbered 1 to 7. Here it is assumed that the transmission beams with adjacent numbers are also adjacent in space. Reception beams on a user equipment side are numbered 1 to 4. Here, it is assumed that the reception beams with adjacent numbers are also adjacent in space. In FIG. 13, it is assumed that the best transmission beam is a transmission beam numbered 4, and the best reception beam is a reception beam numbered 3. Here, assuming that n=1, transmission beams adjacent to the best transmission beam include a transmission beam numbered 3 and a transmission beam numbered 5.

In addition, the reception quality of the transmission beam adjacent to the best transmission beam indicates a reception quality in a case that the electronic device 1200 transmits information with the transmission beam adjacent to the best transmission beam and the user equipment receives information with the best reception beam. Here, reception quality information includes but is not limited to Signal to Interference Ratio (SIR), Signal to Interference plus Noise Ratio (SINR), Signal Noise Ratio (SNR) and Reference Signal Receiving Power (RSRP). In an example shown in FIG. 13, assuming that the reception quality information is represented by RSRP, the reception quality of the transmission beam adjacent to the best transmission beam indicates RSRP in a case that the base station transmits information with a transmission beam numbered 3 and the user equipment receives information with a reception beam numbered 3, and RSRP in a case that the base station transmits information with a transmission beam numbered 5 and the user equipment receives information with a reception beam numbered 3.

According to an embodiment of the present disclosure, the reception quality may be expressed by an absolute value of the reception quality, or by a ratio of the reception quality to a reception quality of a best beam pair (that is, a reception quality in a case that the electronic device 1200 transmits information with the best transmission beam and the user equipment receives information with the best reception beam). For example, the reception quality of the transmission beam adjacent to the best transmission beam may be expressed by a ratio of RSRP in a case that the base station transmits information with a transmission beam numbered 3 and the user equipment receives information with a reception beam numbered 3 to RSRP in a case that the base station transmits information with a transmission beam numbered 4 and the user equipment receives information with a reception beam numbered 3, and a ratio of RSRP in a case that the base station transmits information with a transmission beam numbered 5 and the user equipment receives information with a reception beam numbered 3 to RSRP in a case that the base station transmits information with a transmission beam numbered 4 and the user equipment receives information with a reception beam numbered 3.

According to an embodiment of the present disclosure, as shown in FIG. 12, the electronic device 1200 may further include a training unit 1240 configured to perform a beam training process with the user equipment. The electronic device 1200 may further include a communication unit 1250 configured to transmit and receive information to and from another device.

According to an embodiment of the present disclosure, the training unit 1240 may perform a beam training process with the user equipment at a first cycle. After each beam training process is performed, the electronic device 1200 may receive the best transmission beam of the electronic device 1200 from the user equipment through the communication unit 1250. For example, the electronic device 1200 may receive PMI from the user equipment to know the best transmission beam. Optionally, after each beam training process is performed, the electronic device 1200 may further receive the reception quality of the transmission beam adjacent to the best transmission beam from the user equipment through the communication unit 1250. In this way, after each beam training process, the electronic device 1200 may store the information on the best transmission beam, and optionally information on the reception quality of the transmission beam adjacent to the best transmission beam, in the storage unit 1230, so that the prediction unit 1210 may predict the best transmission beam by using the historical information of the best transmission beam, and optionally the historical information of the reception quality of the transmission beam adjacent to the best transmission beam.

According to an embodiment of the present disclosure, the prediction unit 1210 performs a prediction process after each beam training process is performed, to predict the best transmission beam of the electronic device 1200 at the one or more time points before a next beam training process is performed. In the present disclosure, the one or more time points are also referred to as prediction time points. Here, one or more prediction time points may be equally spaced, and a distance between two adjacent prediction time points may be referred to as a prediction cycle.

Figure 14:
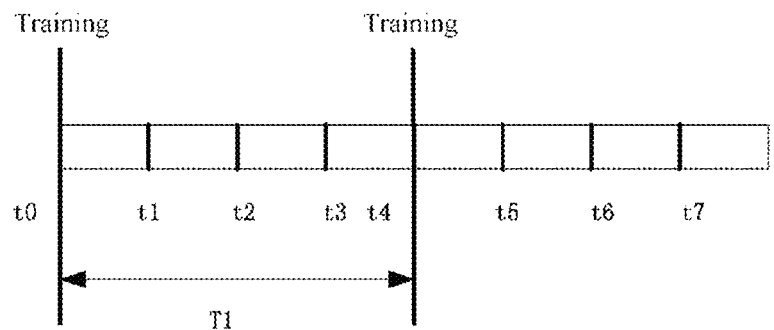
FIG. 14 is a schematic diagram showing each prediction time according to an embodiment of the present disclosure.

FIG. 14 is a schematic diagram showing each prediction time according to an embodiment of the present disclosure. As shown in FIG. 14, the first cycle is denoted by T1. That is, the beam training process is performed with a cycle of T1. That is, the beam training process is performed at time t0 and time t4. Further, assuming that the first cycle T1 is four times of the prediction cycle, time t1, t2 and t3 are prediction time points. That is, at time t0, the electronic device 1200 performs a beam training process with the user equipment, so that the electronic device 1200 acquires a best transmission beam, and optionally a reception quality of a transmission beam adjacent to the best transmission beam. Therefore, the electronic device 1200 may predict a best transmission beam at time t1, t2 and t3 by using historical information of the best transmission beam, and optionally historical information of the reception quality of the transmission beam adjacent to the best transmission beam. Next, at time t4, the electronic device 1200 performs a beam training process with the user equipment, so that the electronic device 1200 acquires a best transmission beam, and optionally a reception quality of a transmission beam adjacent to the best transmission beam. Therefore, the electronic device 1200 may predict a best transmission beam at time t5, t6 and t7 by using historical information of the best transmission beam, and optionally historical information of the reception quality of the transmission beam adjacent to the best transmission beam, and so on.

According to an embodiment of the present disclosure, the first cycle may be an integer multiple of the prediction cycle. In a non-limiting embodiment, the first cycle may be 80 ms, and the prediction cycle may be 20 ms. In addition, the prediction cycle may be the same as the cycle of the traditional beam training. That is, in the traditional beam training solution, the beam training process is performed between the base station and the user equipment with a cycle of 20 ms, while in the present solution, the beam training process is performed between the base station and the user equipment with a cycle of 80 ms, and the prediction process is performed with a cycle of 20 ms to predict the best transmission beam. Therefore, the number of beam training processes can be reduced, thereby reducing an overhead caused by beam training.

Figure 15:
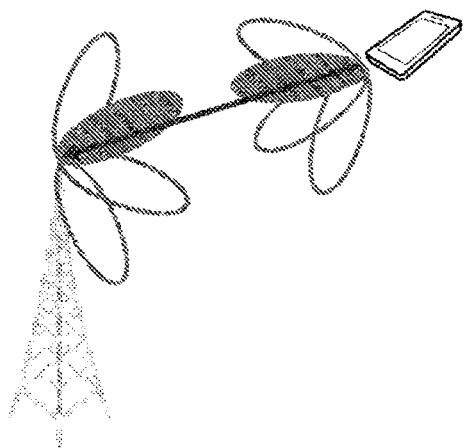
FIG. 15 is a schematic diagram illustrating that a direction of a best beam pair is associated with a relative positional relationship between a user equipment and a base station according to an embodiment of the present disclosure.

FIG. 15 is a schematic diagram illustrating that a direction of a best beam pair is associated with a relative positional relationship between a user equipment and a base station according to an embodiment of the present disclosure. As shown in FIG. 15, the best transmission beam and the best reception beam may reflect a positional relationship between the electronic device 1200 and the user equipment to some extent. That is, a positional relationship between the user equipment and the electronic device 1200 may be estimated based on the best transmission beam. Specifically, an orientation of the user equipment with respect to the electronic device 1200 may be estimated. Similarly, a positional relationship between the user equipment and the electronic device 1200 may also be estimated based on the best reception beam. Specifically, an orientation of the electronic device 1200 with respect to the user equipment may be estimated.

Figure 16:
FIG. 16 is a schematic diagram illustrating that a change in a direction of a best beam pair is associated with a movement feature of a user equipment according to an embodiment of the present disclosure.

FIG. 16 is a schematic diagram illustrating that a change in a direction of a best beam pair is associated with a movement feature of a user equipment according to an embodiment of the present disclosure. As shown in FIG. 16, in a case that the user equipment is carried by a pedestrian, best beams obtained by two adjacent beam training processes change a little with respect to each other. However, in a case that the user equipment is carried by people on a high-speed train, best beams obtained by two adjacent beam training processes change greatly with respect to each other. Here, the best beam may be the best transmission beam or the best reception beam. That is, a movement speed and direction of the user equipment may be estimated based on historical information of the best transmission beam. Similarly, a movement speed and direction of the user equipment may also be estimated based on historical information of the best reception beam.

It can be seen that, a change in the best beam may reflect a movement feature of the user equipment. Similarly, a reception quality of a beam adjacent to the best beam may also reflect the movement feature of the user equipment. The above principle is adopted by the present disclosure.

According to an embodiment of the present disclosure, the prediction unit 1210 may estimate a movement feature of the user equipment based on the historical information of the best transmission beam, and optionally the historical information of the reception quality of the transmission beam adjacent to the best transmission beam. The movement feature may include a movement direction and a movement speed of the user equipment. In an embodiment, the prediction unit 1210 may estimate an orientation of the user equipment, based on the best transmission beam acquired in this beam training process, and optionally the reception quality of the transmission beam adjacent to the best transmission beam acquired in this beam training process, and then estimate a change in the orientation of the user equipment based on the historical information of the best transmission beam, and optionally the historical information of the reception quality of the transmission beam adjacent to the best transmission beam, so as to estimate a movement feature of the user equipment.

According to an embodiment of the present disclosure, the prediction unit 1210 may estimate a relative direction between the user equipment and the electronic device 1200 at one or more time points based on the movement feature of the user equipment. Here, since a change in the movement feature of the user equipment in a short period of time is negligible, the prediction unit 1210 may estimate an orientation of the user equipment at each prediction time point, that is, a relative direction with respect to the electronic device 1200, based on the estimated movement feature of the user equipment.

According to an embodiment of the present disclosure, the prediction unit 1210 may predict the best transmission beam of the electronic device 1200 at the one or more time points based on the estimated relative direction between the user equipment and the electronic device 1200 at the one or more time points. That is, at each prediction time point, the prediction unit 1210 may determine a transmission beam closest to the orientation of the user equipment as the best transmission beam at the prediction time point.

According to an embodiment of the present disclosure, the prediction unit 1210 may predict the best transmission beam of the electronic device 1200 at the one or more time points using a neural network model. Here, the electronic device 1200 may train the neural network model in advance or periodically by using known data to improve the accuracy of the neural network model.

According to an embodiment of the present disclosure, the prediction unit 1210 may predict by using a two-level neural network model. A first-level neural network model is used to output the movement feature of the user equipment, and a second-level neural network is used to output the best transmission beam at each prediction time point.

Figure 17:
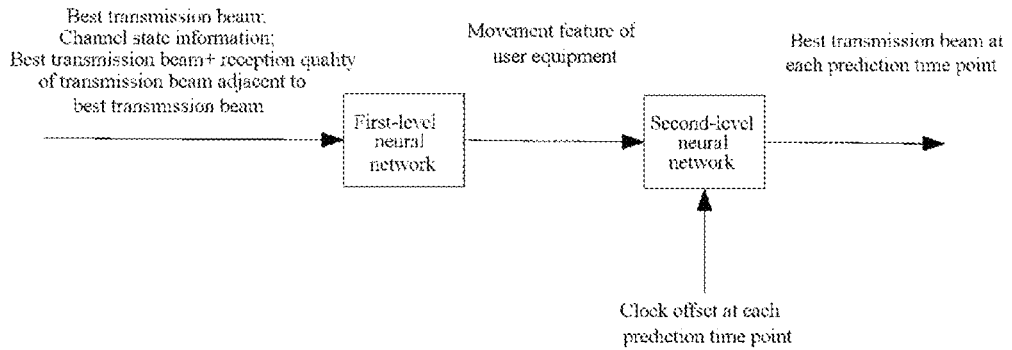
FIG. 17 is a schematic diagram showing a structure of a neural network model for predicting a best transmission beam according to an embodiment of the present disclosure.

FIG. 17 is a schematic diagram showing a structure of a neural network model for predicting a best transmission beam according to an embodiment of the present disclosure. As shown in FIG. 17, an input of the first-level neural network model is the best transmission beam, and optionally the reception quality of the transmission beam adjacent to the best transmission beam, and an output is the movement feature of the user equipment. An input of the second-level neural network model is the movement feature of the user equipment and a clock offset at each prediction time, and an output is the best transmission beam at each prediction time.

Figure 19:
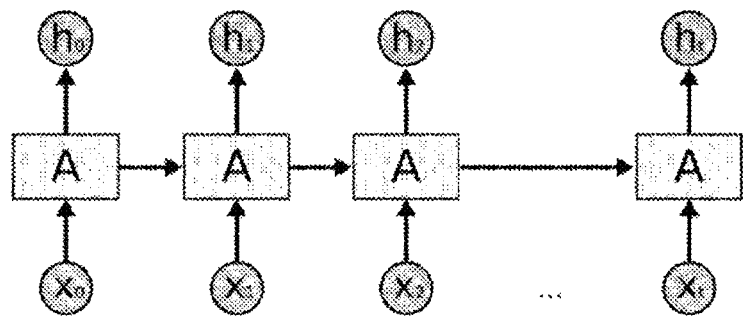
FIG. 19 is a schematic diagram showing a structure of a Long Short-Term Memory (LSTM) network according to an embodiment of the present disclosure.

According to an embodiment of the present disclosure, the first-level neural network model includes a neural network model that may extract an association feature of a time-domain sequence, including but not limited to an LSTM network model. FIG. 19 is a schematic diagram showing a structure of an LSTM network according to an embodiment of the present disclosure. As shown in FIG. 19, A represents an LSTM network model of each layer, $h_i$ represents output information of each prediction, $x_i$ represents input information of each prediction, and i ranges from 0 to t. For example, in a first layer LSTM, an input $x_0$ is information obtained in a first beam training process (the best transmission beam or the best transmission beam and the reception quality of the transmission beam adjacent to the best transmission beam), and an output $h_0$ is a movement feature of the user equipment predicted for a first time. In a second layer LSTM, an input $x_1$ is information obtained in a second beam training process, an input $h_0$ is the movement feature of the user equipment predicted for the first time, and an output $h_1$ is a movement feature of the user equipment predicted for a second time, and so on. That is, output information of a previous layer LSTM may be used as input information of a current layer LSTM. Therefore, the LSTM network may analyze a time-varying feature of the sequence. That is, historical information of the input information may be used to obtain the movement feature of the user equipment.

According to an embodiment of the present disclosure, the second-level neural network model may include a fully connected layer and a softmax activation function layer, which is not limited in the present disclosure.

According to an embodiment of the present disclosure, a clock offset at a prediction time point indicates a ratio of a time interval between the prediction time point and time at which a last beam training is performed to a cycle of beam training. For example, if a cycle of beam training is T1, and the time at which a last beam training is performed is P0, a clock offset at a prediction time point Pm is (Pm−P0)/T1.

In an example shown in FIG. 14, at time t1, the time at which a last beam training is performed is t0, and then a clock offset at time t1 is (t1−t0)/T1=0.25. In a similar way, it may be calculated that a clock offset at time t2 is 0.5, and a clock offset at time t3 is 0.75.

According to an embodiment of the present disclosure, by sequentially inputting the clock offsets at time t1, t2 and t3 to the second-level neural network, the best transmission beams for time t1, t2 and t3 may be output.

According to an embodiment of the present disclosure, as shown in FIG. 12, the electronic device 1200 may further include a configuration unit 1260 configured to configure information about each prediction time point. Further, the electronic device 1200 may also transmit configured information about each prediction time point to the user equipment through the communication unit 1250, to inform the user equipment that beam switching may be performed at each configured prediction time point. For example, the electronic device 1200 may transmit, to the user equipment, absolute time of each prediction time point, relative time between absolute time of each prediction time point and current time or standard time, time of one prediction time point and a prediction interval, or the like. The manner in which the electronic device 1200 transmits the information about the prediction time point is not limited in the present disclosure.

According to an embodiment of the present disclosure, the configuration unit 1260 may further configure a beam sequence by which the electronic device 1200 performs beam scanning, and may transmit information on the beam sequence to the user equipment through the communication unit 1250. For example, the electronic device 1200 may sequentially number transmission beams based on a spatial sequence, and may inform the user equipment of a mapping relationship between a reference signal and a number of a transmission beam. In this way, in a case that the user equipment receives the reference signal, the transmission beam to which the reference signal corresponds may be known, so as to know a spatial position relationship of the transmission beam. Therefore, the user equipment may acquire a transmission beam adjacent to the best transmission beam, thereby transmitting the reception quality of the adjacent transmission beam to the electronic device 1200.

According to an embodiment of the present disclosure, since the information about each prediction time point and the beam sequence by which the electronic device 1200 performs beam scanning configured by the configuration unit 1260 are relatively static information, the electronic device 1200 may carry such information through RRC signaling. In addition, where any one of the information about each prediction time point and the beam sequence by which the electronic device 1200 performs beam scanning changes, the electronic device 1200 may also transmit updated configuration information through the RRC signaling.

As described above, the embodiment in which the electronic device 1200 predicts the best transmission beam for the high-frequency link using the information on the high-frequency link is described in detail. The information on the high-frequency link may include the historical information of the best transmission beam for the high-frequency link, or the historical information of the best transmission beam for the high-frequency link and the historical information of the reception quality of the transmission beam adjacent to the best transmission beam for the high-frequency link. An embodiment in which the electronic device 1200 predicts the best transmission beam using information on a low-frequency link will be described in detail below.

<The Electronic Device 1200 Predicting the Best Transmission Beam Using Information on the Low-Frequency Link>

Figure 20:
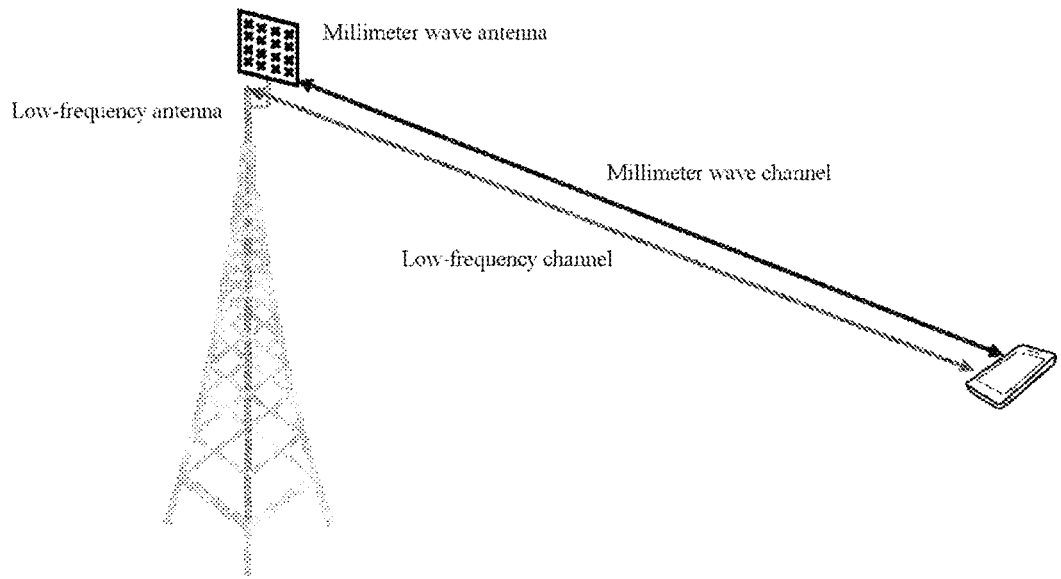
FIG. 20 is a schematic diagram showing a scenario in which communication between a user equipment and a base station is performed using a low-frequency channel and a millimeter wave channel according to an embodiment of the present disclosure.

FIG. 20 is a schematic diagram showing a scenario in which communication between a user equipment and a base station is performed using a low-frequency channel and a millimeter wave channel according to an embodiment of the present disclosure. As shown in FIG. 20, a millimeter wave antenna is arranged on a low-frequency antenna. Therefore, the user equipment and the base station may communicate using the low-frequency channel or the high-frequency channel of the millimeter wave channel.

According to an embodiment of the present disclosure, in a case that the electronic device 1200 communicates with the user equipment through a high-frequency link and a low-frequency link, since the high-frequency link and the low-frequency link have similar spatial features, the prediction unit 1210 may predict the best transmission beam of the electronic device 1200 for the high-frequency link at the one or more time points based on information on the low-frequency link.

According to an embodiment of the present disclosure, the information on the low-frequency link may include the historical information of the best transmission beam for the low-frequency link. That is, the prediction unit 1210 may predict the best transmission beam for the high-frequency link at each prediction time point, based on the historical information of the best transmission beam for the low-frequency link, which is similar to the above process of predicting the best transmission beam for the high-frequency link at each prediction time point based on the historical information of the best transmission beam for the high-frequency link, which is not repeated here.

According to an embodiment of the present disclosure, the information on the low-frequency link may further include historical information of a reception quality of a transmission beam adjacent to the best transmission beam for the low-frequency link. That is, the prediction unit 1210 may predict the best transmission beam for the high-frequency link at each prediction time point, based on the historical information of the best transmission beam for the low-frequency link and the historical information of the reception quality of the transmission beam adjacent to the best transmission beam for the low-frequency link, which is similar to the above process of predicting the best transmission beam at each prediction time point for the high-frequency link based on the historical information of the best transmission beam for the high-frequency link and the historical information of the reception quality of the transmission beam adjacent to the best transmission beam for the high-frequency link, which is not repeated here.

According to an embodiment of the present disclosure, the information on the low-frequency link may further include historical information of the Channel State Information (CSI) for the low-frequency link. That is, the prediction unit 1210 may predict the best transmission beam for the high-frequency link at each prediction time point, based on the historical information of CSI for the low-frequency link.

According to an embodiment of the present disclosure, CSI may include uplink CSI and downlink CSI. That is, the prediction unit 1210 may predict the best transmission beam for the high-frequency link at each prediction time point, based on historical information of uplink CSI and/or downlink CSI for the low-frequency link. Here, the electronic device 1200 may acquire uplink CSI by measuring an uplink, and the electronic device 1200 may acquire downlink CSI from the user equipment. Further, the electronic device 1200 may store uplink CSI and/or downlink CSI in the storage unit 1230, so that the historical information of CSI may be acquired.

According to an embodiment of the present disclosure, the electronic device 1200 may acquire the information on the low-frequency link at a second cycle of T2 through the communication unit 1250. Preferably, the second cycle T2 is greater than the first cycle T1. For example, the second cycle T2 may be 100 ms or more. Further, each time after the information on the low-frequency link is acquired, the prediction unit 1210 may perform a prediction process, to predict the best transmission beam of the electronic device 1200 at the one or more time points before next information on the low-frequency link is acquired. That is, there are one or more prediction time points by a prediction cycle, between time at which information on the low-frequency link is acquired and time at which next information on the low-frequency link is acquired, and the prediction time points may include time at which beam training for the high-frequency link is performed.

Figure 21:
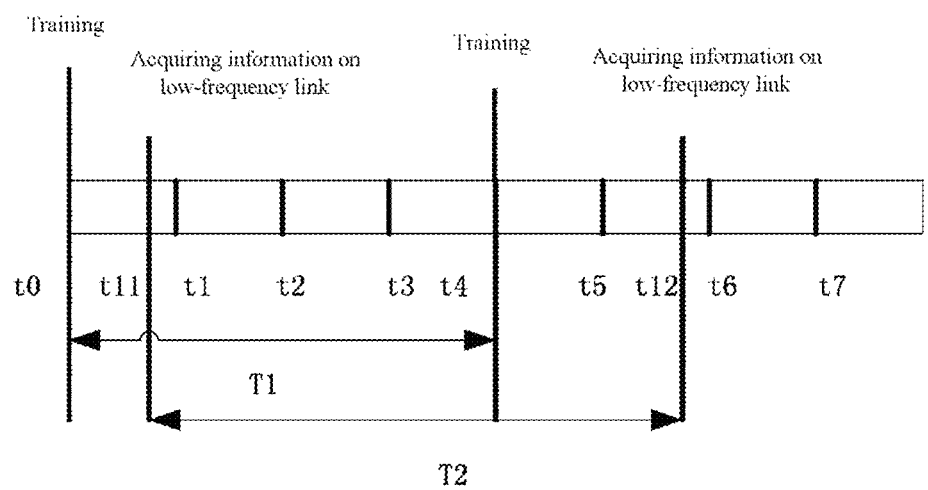
FIG. 21 is a schematic diagram showing a relationship between time at which information on a low-frequency link is acquired and each prediction time according to an embodiment of the present disclosure.

FIG. 21 is a schematic diagram showing a relationship between time at which information on a low-frequency link is acquired and each prediction time according to an embodiment of the present disclosure. As shown in FIG. 21, at time t11, the electronic device 1200 acquires information on the low-frequency link, and predicts a best transmission beam of the electronic device 1200 at time t1, t2, t3, t4 and t5. At time t12, the electronic device 1200 acquires information on the low-frequency link again, and then predicts a best transmission beam of the electronic device 1200 at time t6, t7, etc. That is, in a case of predicting the best transmission beam for the high-frequency link using the information on the low-frequency link, the start of the prediction process is associated with the time at which the information on the low-frequency link is acquired, but not relevant to the beam training process.

According to an embodiment of the present disclosure, CSI may also reflect information on relative orientation between the user equipment and the base station, and a change in CSI may reflect a change in the relative orientation between the user equipment and the base station, so it may reflect a movement feature of the user equipment, which includes a movement direction and a movement speed of the user equipment. The above principle is adopted by the present disclosure.

According to an embodiment of the present disclosure, the prediction unit 1210 may estimate a movement feature of the user equipment based on the historical information of CSI. The movement feature may include a movement direction and a movement speed of the user equipment. In an embodiment, the prediction unit 1210 may estimate an orientation of the user equipment based on CSI in low-frequency link information acquired this time, and then estimate a change in the orientation of the user equipment based on the historical information of CSI, to estimate a movement feature of the user equipment.

According to an embodiment of the present disclosure, the prediction unit 1210 may estimate a relative direction between the user equipment and the electronic device 1200 at one or more time points based on the movement feature of the user equipment. Here, since a change in the movement feature of the user equipment in a short period of time is negligible, the prediction unit 1210 may estimate an orientation of the user equipment at each prediction time point, that is, a relative direction with respect to the electronic device 1200, based on the estimated movement feature of the user equipment.

According to an embodiment of the present disclosure, the prediction unit 1210 may predict the best transmission beam of the electronic device 1200 at the one or more time points based on the estimated relative direction between the user equipment and the electronic device 1200 at the one or more time points. That is, at each prediction time point, the prediction unit 1210 may determine a transmission beam closest to the orientation of the user equipment as the best transmission beam at the prediction time point.

According to an embodiment of the present disclosure, the prediction unit 1210 may predict the best transmission beam of the electronic device 1200 at the one or more time points using a neural network model. The neural network model is similar to the model that predicts the best transmission beam for the high-frequency link using the information on the high-frequency link described above, except that input information is different and a method for calculating a clock offset at each prediction time point is different. In a case that the best transmission beam for the high-frequency link is predicted by using the information on the low-frequency link, an input of the first-level neural network model may be the best transmission beam for the low-frequency link, or the best transmission beam for the low-frequency link and the reception quality of the transmission beam adjacent to the best transmission beam for the low-frequency link, or CSI for the low-frequency link. The method for calculating clock offset at each prediction time point in a case of predicting the best transmission beam for the high-frequency link using the information on the low-frequency link will be described below.

According to an embodiment of the present disclosure, a clock offset at a prediction time point indicates a ratio of a time interval between the prediction time point and time at which information on the low-frequency link is acquired last time to a cycle of acquiring information on the low-frequency link. For example, if a cycle of acquiring information on the low-frequency link is T2, and the time at which information on the low-frequency link is acquired last time is Q0, a clock offset at a prediction time point Qm is (Qm−Q0)/T2.

As described above, according to the embodiment of the present disclosure, the electronic device 1200 may predict the best transmission beam for the high-frequency link based on the information on the low-frequency link. The information on the low-frequency link may include the historical information of the best transmission beam for the low-frequency link, the historical information of the best transmission beam for the low-frequency link and the historical information of the reception quality of the transmission beam adjacent to the best transmission beam for the low-frequency link, or the historical information of CSI for the low-frequency link.

According to an embodiment of the present disclosure, after the prediction unit 1210 predicts the best transmission beam of the electronic device 1200, the switching unit 1220 may determine time when switching is actually required and a transmission beam after switching.

The electronic device 1200 may further transmit the time when switching is actually required and the transmission beam after switching to the user equipment through the communication unit 1250. For example, in a case that a transmission beam numbered 1 is determined as the best transmission beam through the beam training process at time t0, and the prediction unit 1210 predicts a transmission beam numbered 1 as the best transmission beam at time t1, a transmission beam numbered 2 as the best transmission beam at time t2, and a transmission beam numbered 2 as the best transmission beam at time t3, the electronic device 1200 may transmit, to the user equipment, information indicating that the time when beam switching is actually required is time t2 and the transmission beam after switching is the transmission beam numbered 2.

According to an embodiment of the present disclosure, with the electronic device 1200, not only a best transmission beam of the electronic device 1200 may be predicted, but also a best reception beam of a user equipment may be predicted, which is described in detail below.

According to an embodiment of the present disclosure, the prediction unit 1210 may predict a best reception beam of the user equipment based on information on a high-frequency link.

According to an embodiment of the present disclosure, the information on the high-frequency link may include historical information of a best reception beam of the user equipment. That is, the prediction unit 1210 may predict a best reception beam of the user equipment at each prediction time point based on historical information of a best reception beam of the user equipment.

According to an embodiment of the present disclosure, the information on the high-frequency link may further include historical information of a reception quality of a reception beam adjacent to the best reception beam of the user equipment. That is, the prediction unit 1210 may predict the best reception beam of the user equipment at each prediction time point based on the historical information of the best reception beam of the user equipment and the historical information of the reception quality of the reception beam adjacent to the best reception beam of the user equipment.

According to an embodiment of the present disclosure, the reception beam adjacent to the best reception beam of the user equipment includes a reception beam whose spatial distance from the best reception beam is within a predetermined range.

Here, a spatial distance between two beams may be expressed by the number of beams by which the two beams differ. For example, in a case that reception beams of the user equipment are numbered in sequence, a spatial distance between a reception beam numbered 1 and a reception beam numbered 3 is 2 reception beams. The predetermined range may be, for example, n reception beams, where n is a positive integer. In a case of n=1, the reception beam adjacent to the best reception beam of the user equipment includes a reception beam whose spatial distance from the best reception beam is within 1 reception beam. In a case of n=2, the reception beam adjacent to the best reception beam of the user equipment includes a reception beam whose spatial distance from the best reception beam is within 2 reception beams, and so on.

In FIG. 13, it is assumed that the best transmission beam is a transmission beam numbered 4, and the best reception beam is a reception beam numbered 3. Here, assuming that n=1, the reception beams adjacent to the best reception beam include a reception beam numbered 2 and a reception beam numbered 4.

In addition, the reception quality of the reception beam adjacent to the best reception beam indicates a reception quality in a case that the electronic device 1200 transmits information with the best transmission beam and the user equipment receives information with the reception beam adjacent to the best reception beam. Here, information on the reception quality includes but is not limited to SIR, SINR, SNR and RSRP. In an example shown in FIG. 13, assuming that the information on the reception quality is represented by RSRP, the reception quality of the reception beam adjacent to the best reception beam indicates RSRP in a case that the base station transmits information with a transmission beam numbered 4 and the user equipment receives information with a reception beam numbered 2, and RSRP in a case that the base station transmits information with a transmission beam numbered 4 and the user equipment receives information with a reception beam numbered 4.

According to an embodiment of the present disclosure, after each beam training process, the electronic device 1200 may receive the best reception beam of the user equipment from the user equipment, and may store the best reception beam of the user equipment in the storage unit 1230, thereby the historical information of the best reception beam of the user equipment may be obtained. Optionally, after each beam training process, the electronic device 1200 may also receive the reception quality of the reception beam adjacent to the best reception beam of the user equipment from the user equipment, and may store the reception quality of the reception beam adjacent to the best reception beam of the user equipment in the storage unit 1230, thereby the historical information of the reception quality of the reception beam adjacent to the best reception beam of the user equipment may be obtained.

According to an embodiment of the present disclosure, the prediction unit 1210 may predict a best reception beam of the user equipment at each prediction time point after each beam training process is performed.

According to an embodiment of the present disclosure, the prediction unit 1210 may predict a best reception beam of the user equipment based on information on a low-frequency link.

According to an embodiment of the present disclosure, the information on the low-frequency link may include historical information of a best reception beam of the user equipment for the low-frequency link, or historical information of a best reception beam of the user equipment for the low-frequency link and historical information of a reception quality of the reception beam adjacent to the best reception beam of the user equipment for the low-frequency link.

According to an embodiment of the present disclosure, the information on the low-frequency link may include historical information of channel state information of a channel between the user equipment and the electronic device 1200. Similarly, CSI may include uplink CSI and downlink CSI. That is, the prediction unit 1210 may predict the best reception beam of the user equipment based on the historical information of CSI.

According to an embodiment of the present disclosure, the prediction unit 1210 may predict the best reception beam of the user equipment at each prediction time point each time after the information on the low-frequency link is acquired.

According to an embodiment of the present disclosure, the prediction unit 1210 may predict the best reception beam of the user equipment using a neural network model.

Figure 18:
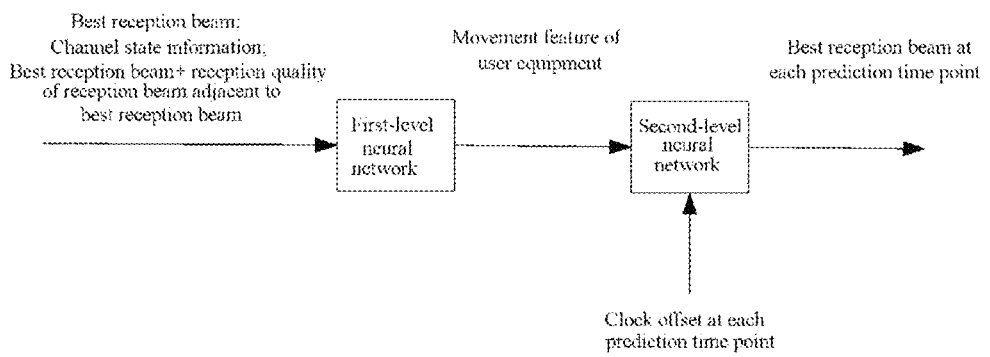
FIG. 18 is a schematic diagram showing a structure of a neural network model for predicting a best reception beam according to an embodiment of the present disclosure.

FIG. 18 is a schematic diagram showing a structure of a neural network model for predicting a best reception beam according to an embodiment of the present disclosure. As shown in FIG. 18, an input of a first-level neural network model is the best reception beam (for the low-frequency link or the high-frequency link), or the channel state information (for the low-frequency link), or the best reception beam (for the low-frequency link or the high-frequency link) and the reception quality of the reception beam adjacent to the best reception beam (for the low-frequency link or the high-frequency link), and an output is a movement feature of the user equipment. An input of a second-level neural network model is the movement feature of the user equipment and a clock offset at each prediction time point, and an output is the best reception beam at each prediction time point. The structure of the neural network model for predicting the best reception beam shown in FIG. 18 is similar to that of the neural network model for predicting the best transmission beam shown in FIG. 17, except that the input is different. Thus, the same part is not repeated here.

According to an embodiment of the present disclosure, after the prediction unit 1210 predicts the best reception beam of the user equipment, the predicted best reception beam of the user equipment at each prediction time point may be transmitted to the user equipment through the communication unit 1250.

It can be seen that, according to the embodiment of the present disclosure, the electronic device 1200 may predict the best transmission beam for the high-frequency link at each prediction time point, based on the information on the high-frequency link, after each beam training process is performed, or may predict the best transmission beam for the high-frequency link at each prediction time point, based on the information on the low-frequency link, each time after the information on the low-frequency link is acquired. In this way, the electronic device 1200 is not required to perform the beam training process in the original cycle, which reduces the number of beam training, thus reducing the overhead for beam training. Further, according to the embodiment of the present disclosure, the electronic device 1200 may further predict the best reception beam of the user equipment for the high-frequency link at each prediction time point, based on the information on the high-frequency link after each beam training process is performed, or may predict the best reception beam of the user equipment for the high-frequency link at each prediction time point, based on the information on the low-frequency link, each time after the information on the low-frequency link is acquired. In this way, the user equipment is not required to perform the beam training process in the original cycle, thereby reducing the number of beam training for the user equipment, and reducing the overhead for beam training. Further, such a process is performed by the electronic device 1200, which can reduce the calculation amount of the user equipment.

3. Configuration Example of a User Equipment

Figure 22:
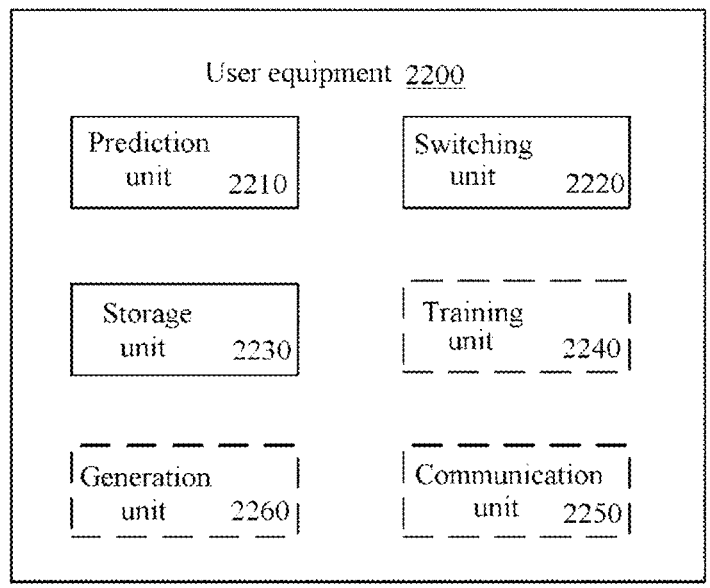
FIG. 22 is a block diagram showing an example of a configuration of a user equipment according to an embodiment of a second aspect of the present disclosure.

FIG. 22 is a block diagram showing a structure of a user equipment 2200 in a wireless communication system according to an embodiment of the present disclosure.

As shown in FIG. 22, the user equipment 2200 may include a prediction unit 2210, a switching unit 2220 and a storage unit 2230.

Here, each unit of the user equipment 2200 may be included in a processing circuit. It should be noted that the user equipment 2200 may include one processing circuit or multiple processing circuits. Further, the processing circuit may include various discrete functional units to perform different functions and/or operations. It should be noted that these functional units may be physical entities or logical entities, and units with different names may be implemented by a same physical entity.

According to an embodiment of the present disclosure, the prediction unit 2210 may predict a best reception beam of the user equipment 2200 at one or more time points based on historical information of a best reception beam of the user equipment 2200 or historical information of channel state information of a channel between the user equipment 2200 and a network side device.

According to an embodiment of the present disclosure, the storage unit 2230 may store the historical information of the best reception beam of the user equipment 2200 and/or the historical information of the channel state information of the channel between the user equipment 2200 and the network side device.

According to an embodiment of the present disclosure, the switching unit 2220 may perform beam switching based on the predicted best reception beam of the user equipment 2200 at the one or more time points.

According to an embodiment of the present disclosure, the switching unit 2220 may determine whether beam switching is required at each prediction time point based on a prediction result of the prediction unit 2210. The switching unit 2220 may perform beam switching in a case that beam switching is required. For example, if a predicted best reception beam at a certain time point is the same as a predicted best reception beam at a previous time point, the switching unit 2220 may determine that beam switching is not required at this time point. If a predicted best reception beam at a certain time point is different from a predicted best reception beam at a previous time point, the switching unit 2220 may determine that beam switching is required at this time point.

According to an embodiment of the present disclosure, the prediction unit 2210 may predict the best reception beam of the user equipment 2200 based on information on a high-frequency link.

According to an embodiment of the present disclosure, the information on the high-frequency link may include the historical information of the best reception beam of the user equipment 2200. That is, the prediction unit 2210 may predict the best reception beam of the user equipment 2200 at each prediction time point based on the historical information of the best reception beam of the user equipment.

According to an embodiment of the present disclosure, the information on the high-frequency link may further include historical information of a reception quality of a reception beam adjacent to the best reception beam of the user equipment 2200. That is, the prediction unit 2210 may predict the best reception beam of the user equipment 2200 at each prediction time point, based on the historical information of the best reception beam of the user equipment 2200 and the historical information of the reception quality of the reception beam adjacent to the best reception beam of the user equipment 2200.

According to an embodiment of the present disclosure, the reception beam adjacent to the best reception beam of the user equipment 2200 includes a reception beam whose spatial distance from the best reception beam is within a predetermined range. In addition, the reception quality of the reception beam adjacent to the best reception beam indicates a reception quality in a case that the network side device transmits information with the best transmission beam and the user equipment 2200 receives information with the reception beam adjacent to the best reception beam. Here, information on reception quality includes but is not limited to SIR, SINR, SNR and RSRP.

According to an embodiment of the present disclosure, as shown in FIG. 22, the user equipment 2200 may further include a training unit 2240 configured to perform a beam training process with the network side device at a first cycle. Further, the prediction unit 2210 may perform a prediction process after each beam training process is performed, to predict the best reception beam of the user equipment 2200 at one or more time points before a next beam training process is performed.

For example, after each beam training process is performed, the user equipment 2200 may store the best reception beam in the storage unit 2230. Optionally, the user equipment 2200 may also store the reception quality of the reception beam adjacent to the best reception beam in the storage unit 2230.

According to an embodiment of the present disclosure, as shown in FIG. 22, the user equipment 2200 may further include a generation unit 2260 configured to generate feedback information each time after the training unit 2240 performs the beam training process. Further, the user equipment 2200 may transmit the feedback information to the network side device through a communication unit 2250.

According to an embodiment of the present disclosure, the feedback information may include information on a best transmission beam of the network side device. For example, the best transmission beam of the network side device may be indicated by a Precoding Matrix Indicator (PMI). Optionally, the feedback information may further include a reception quality of a transmission beam adjacent to the best transmission beam of the network side device. In this way, the network side device may predict the best transmission beam by using the information on the best transmission beam, and optionally the information of the reception quality of the transmission beam adjacent to the best transmission beam.

According to an embodiment of the present disclosure, in a case that the user equipment 2200 communicates with the network side device through a high-frequency link and a low-frequency link, the prediction unit 2210 may predict the best reception beam of the user equipment 2200 for the high-frequency link at each prediction time point, based on information on the low-frequency link.

According to an embodiment of the present disclosure, the information on the low-frequency link may include the historical information of the best reception beam for the low-frequency link. That is, the prediction unit 2210 may predict the best reception beam of the user equipment 2200 for the high-frequency link at each prediction time point, based on the historical information of the best reception beam for the low-frequency link.

According to an embodiment of the present disclosure, the information on the low-frequency link may further include the historical information of the reception quality of the reception beam adjacent to the best reception beam for the low-frequency link. That is, the prediction unit 2210 may predict the best reception beam of the user equipment 2200 for the high-frequency link at each prediction time point, based on the historical information of the best reception beam for the low-frequency link and the historical information of the reception quality of the reception beam adjacent to the best reception beam for the low-frequency link.

According to an embodiment of the present disclosure, the information on the low-frequency link may include the historical information of the channel state information for the low-frequency link. CSI may include uplink CSI and downlink CSI. That is, the prediction unit 2210 may predict the best reception beam of the user equipment 2200 based on historical information of uplink CSI and/or historical information of downlink CSI. Here, the user equipment 2200 may receive uplink CSI from the network side device, and may acquire downlink CSI by measuring a downlink.

According to an embodiment of the present disclosure, the prediction unit 2210 may predict the best reception beam of the user equipment at each prediction time point each time after the information on the low-frequency link is acquired.

According to an embodiment of the present disclosure, the user equipment 2200 may acquire the information on the low-frequency link at a second cycle T2. Further, each time after the information on the low-frequency link is acquired, the prediction unit 2210 may perform a prediction process, to predict the best reception beam of the user equipment 2200 at one or more time points before next information on the low-frequency link is acquired.

According to an embodiment of the present disclosure, the prediction unit 2210 may estimate a movement feature of the user equipment 2200, based on the historical information of the best reception beam, or the historical information of the best reception beam and the historical information of the reception quality of the reception beam adjacent to the best reception beam, or the historical information of CSI. The movement feature may include a movement direction and a movement speed of the user equipment 2200. In an embodiment, the prediction unit 2210 may estimate an orientation of the user equipment 2200 based on the best reception beam acquired this time, or the best reception beam and the reception quality of the reception beam adjacent to the best reception beam, or CSI, and then estimate a change in the orientation of the user equipment 2200 based on the historical information of the best reception beam, or the historical information of the best reception beam and the historical information of the reception quality of the reception beam adjacent to the best reception beam, or the historical information of CSI, to estimate a movement feature of the user equipment 2200.

According to an embodiment of the present disclosure, the prediction unit 2210 may estimate a relative direction between the user equipment 2200 and the network side device at one or more time points based on the movement feature of the user equipment 2200. Here, since a change in the movement feature of the user equipment 2200 in a short period of time is negligible, the prediction unit 2210 may estimate an orientation of the user equipment 2200 at each prediction time point based on the estimated movement feature of the user equipment 2200, and further estimate a relative direction between the network side device and the user equipment 2200.

According to an embodiment of the present disclosure, the prediction unit 2210 may predict the best reception beam of the user equipment 2200 at the one or more time points based on the estimated relative direction between the network side device and the user equipment 2200 at the one or more time points. That is, at each prediction time point, the prediction unit 2210 may determine a reception beam closest to the orientation of the network side device as the best reception beam at the prediction time point.

According to an embodiment of the present disclosure, the prediction unit 2210 may predict the best reception beam of the user equipment 2200 at each prediction time point using a neural network model.

As shown in FIG. 18, an input of the first-level neural network model is the best reception beam, or the channel state information, or the best reception beam and the reception quality of the reception beam adjacent to the best reception beam, and an output is the movement feature of the user equipment 2200. An input of the second-level neural network model is the movement feature of the user equipment 2200 and a clock offset at each prediction time point, and an output is the best reception beam at each prediction time point.

According to an embodiment of the present disclosure, the prediction unit 2210 predicts the best reception beam of the user equipment 2200 in a similar way as the prediction unit 1210 predicts the best reception beam of the user equipment 2200. That is, the best reception beam of the user equipment 2200 may be predicted by the user equipment 2200, and the best reception beam of the user equipment 2200 may be predicted by the network side device, as well.

According to an embodiment of the present disclosure, the user equipment 2200 may also receive information about the one or more time points from the network side device through the communication unit 2250. For example, the user equipment 2200 may receive absolute time of each prediction time point from the network side device, relative time between absolute time of each prediction time point and current time or standard time from the network side device, time of one prediction time point and a prediction interval from the network side device. The manner in which the network side device transmits the information about the prediction time point is not limited in the present disclosure.

According to an embodiment of the present disclosure, the user equipment 2200 may also receive information on beam sequence by which the network side device performs beam scanning from the network side device through the communication unit 2250. For example, the network side device may sequentially number transmission beams based on a spatial sequence. The information on the beam sequence may include a mapping relationship between each reference signal and a number of a transmission beam, so that the user equipment 2200 may know a spatial position relationship of transmission beams corresponding to respective reference signals, and thus may feed back the reception quality of the transmission beam adjacent to the best transmission beam to the network side device.

It can be seen that, according to the embodiment of the present disclosure, the user equipment 2200 may predict the best reception beam for the high-frequency link at each prediction time point, based on the information on the high-frequency link after each beam training process is performed, or may predict the best reception beam for the high-frequency link at each prediction time point, based on the information on the low-frequency link, each time after the information on the low-frequency link is acquired. In this way, the user equipment 2200 is not required to perform the beam training process in the original cycle, which reduces the number of beam training, thus reducing the overhead for beam training.

According to an embodiment of the present disclosure, the best transmission beam may be predicted only by the network side device, and the user equipment 2200 acquires the best reception beam by means of beam training in a case that the network side device switches the beam. In this way, a tradeoff between the overhead for beam training and accuracy with respect to the best beam can be realized.

FIGS. 23 to 28 are flowcharts showing signaling of a beam prediction scheme according to an embodiment of the present disclosure. In FIGS. 23 to 28, a gNB may be implemented by the electronic device 1200, and a UE may be implemented by the user equipment 2200.

Figure 23:
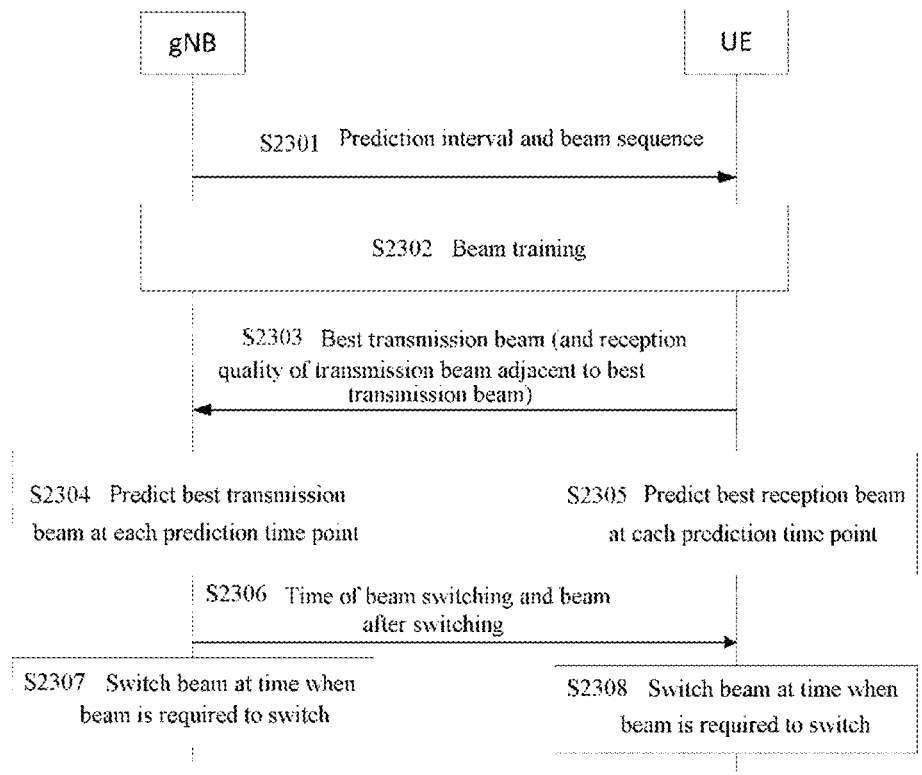
FIG. 23 is a flowchart showing signaling of a beam prediction scheme according to an embodiment of the present disclosure.

As shown in FIG. 23, in step S2301, a gNB transmits information on a prediction interval and information on a beam scanning sequence to a UE. In step S2302, the gNB and the UE perform a beam training process at a first cycle. In step S2303, after each beam training process is finished, the UE transmits, to the gNB, information on a best transmission beam, or information on the best transmission beam and a reception quality of a transmission beam adjacent to the best transmission beam. Next, in step S2304, the gNB predicts a best transmission beam at each prediction time point based on the received information. In step S2305, the UE predicts a best reception beam at each prediction time point based on a best reception beam, or information on the best reception beam and information on a reception quality of a reception beam adjacent to the best reception beam. In step S2306, the gNB transmits, to the UE, time when beam switching is required and a transmission beam after switching. In step S2307, the gNB switches the transmission beam at the time when the transmission beam is required to switch. In step S2308, the UE switches a reception beam at time when the reception beam is required to switch. As mentioned above, the gNB predicts the best transmission beam using information on a high-frequency link, while the UE predicts the best reception beam using the information on the high-frequency link.

Figure 24:
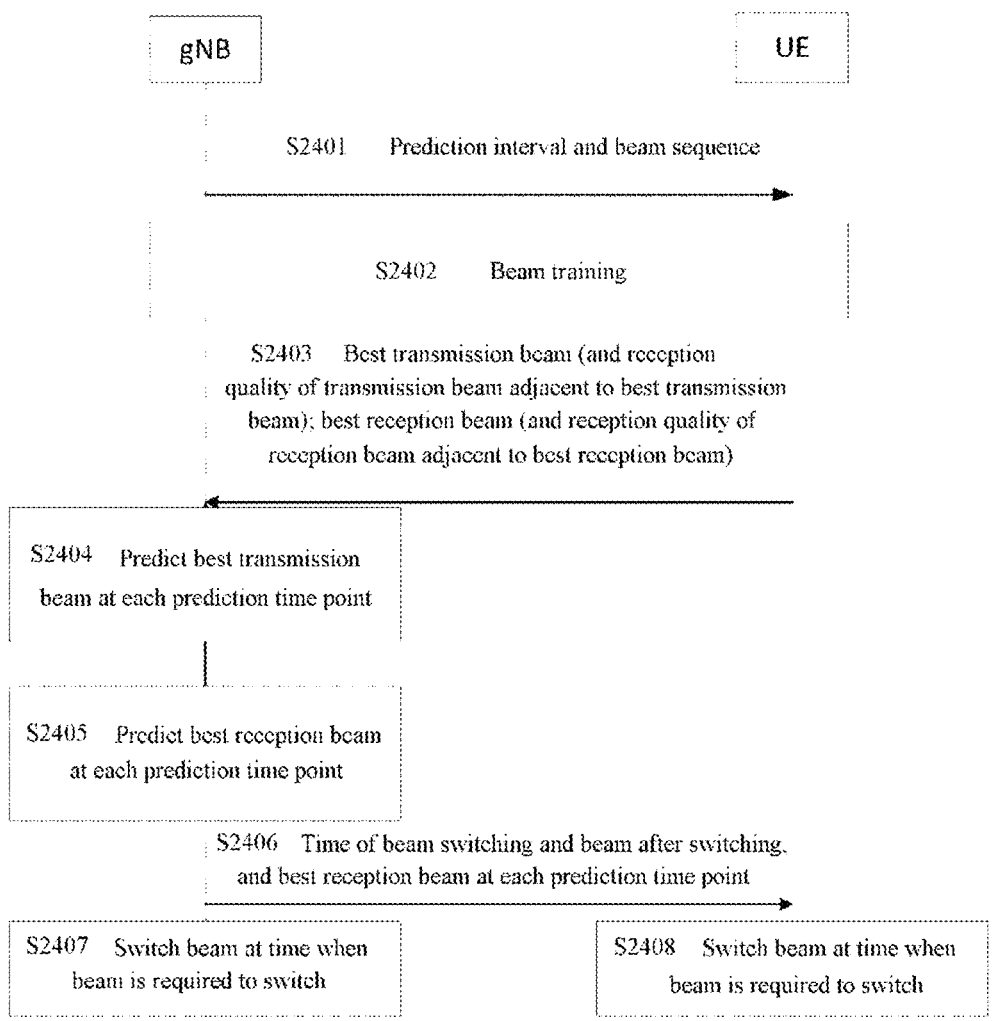
FIG. 24 is a flowchart showing signaling of a beam prediction scheme according to an embodiment of the present disclosure.

As shown in FIG. 24, in step S2401, a gNB transmits information on a prediction interval and information on a beam scanning sequence to a UE. In step S2402, the gNB and the UE perform a beam training process at a first cycle. In step S2403, after each beam training process is finished, the UE transmits, to the gNB, information on a best transmission beam, or information on the best transmission beam and a reception quality of a transmission beam adjacent to the best transmission beam. In addition, the UE further transmits, to the gNB, information on a best reception beam, or information on the best reception beam and a reception quality of a reception beam adjacent to the best reception beam. Next, in step S2404, the gNB predicts a best transmission beam at each prediction time point based on the received information on the best transmission beam, or the information on the best transmission beam and the reception quality of the transmission beam adjacent to the best transmission beam. In step S2405, the gNB predicts a best reception beam of the UE at each prediction time point based on the best reception beam or the information on the best reception beam and the information on the reception quality of the reception beam adjacent to the best reception beam. In step S2406, the gNB transmits, to the UE, time when beam switching is required and a transmission beam after switching. Further, the gNB further transmits, to the UE, the predicted best reception beam of the UE at each prediction time point. In step S2407, the gNB switches the transmission beam at the time when the transmission beam is required to switch. In step S2408, the UE switches a reception beam at time when the reception beam is required to switch. As mentioned above, the gNB predicts the best transmission beam using information on a high-frequency link, and gNB predicts the best reception beam using the information on high-frequency link.

Figure 25:
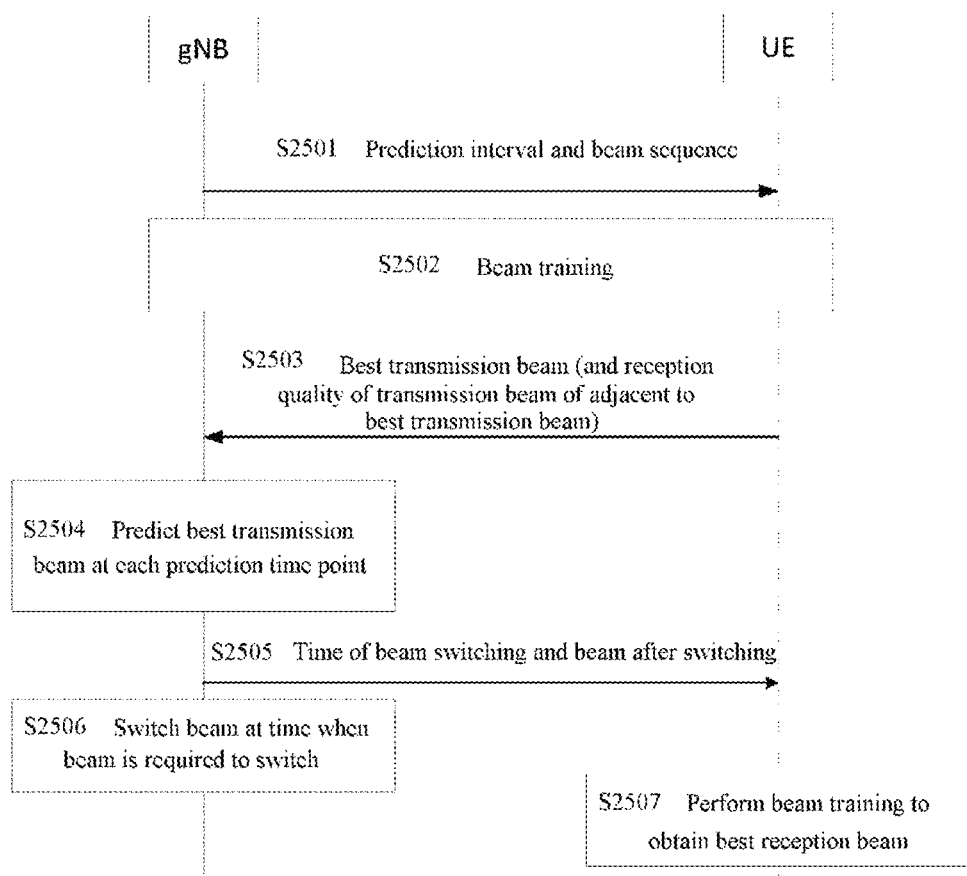
FIG. 25 is a flowchart showing signaling of a beam prediction scheme according to an embodiment of the present disclosure.

As shown in FIG. 25, in step S2501, a gNB transmits information on a prediction interval and information on a beam scanning sequence to a UE. In step S2502, the gNB and the UE perform a beam training process at a first cycle. In step S2503, after each beam training process is finished, the UE transmits, to the gNB, information on a best transmission beam, or information on the best transmission beam and a reception quality of a transmission beam adjacent to the best transmission beam. Next, in step S2504, the gNB predicts a best transmission beam at each prediction time point based on the received information. In step S2505, the gNB transmits, to the UE, time when beam switching is required and a transmission beam after switching. In step S2506, the gNB switches the transmission beam at the time when the transmission beam is required to switch. In step S2507, at the time when the gNB is required to switch the transmission beam, the UE performs beam training to obtain a best reception beam. As mentioned above, the gNB predicts the best transmission beam using information on a high-frequency link, while the UE determines the best reception beam by means of beam training.

Figure 26:
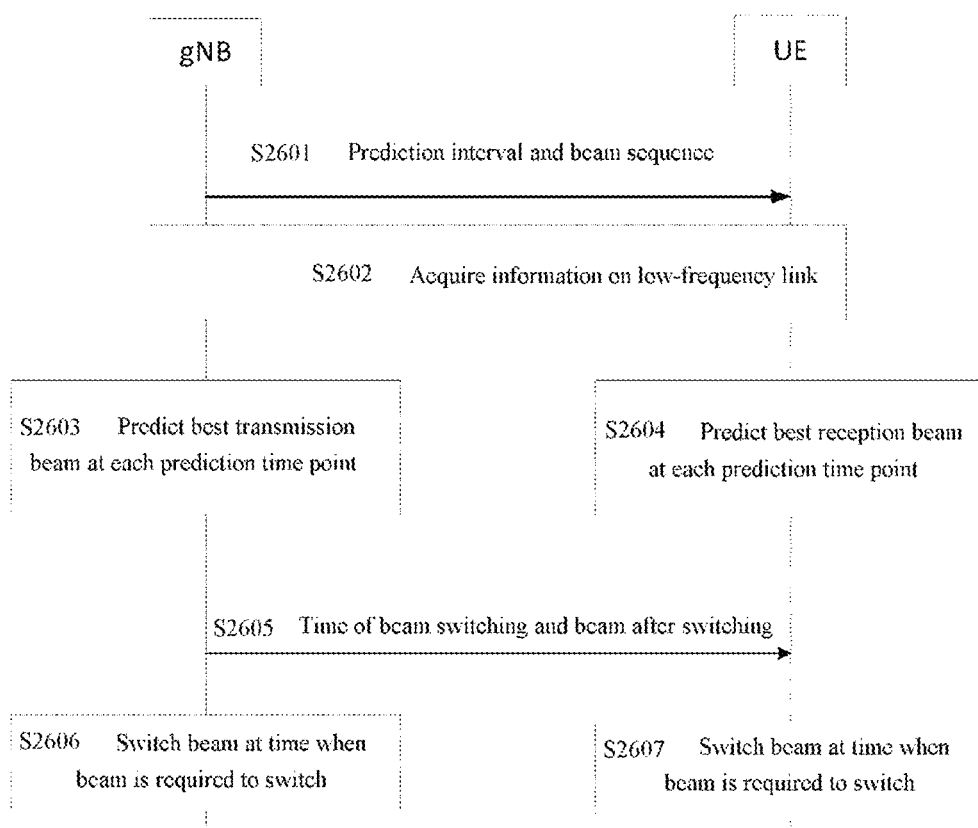
FIG. 26 is a flowchart showing signaling of a beam prediction scheme according to an embodiment of the present disclosure.

As shown in FIG. 26, in step S2601, a gNB transmits information on a prediction interval and information on a beam scanning sequence to a UE. In step S2602, the gNB and the UE acquire information on a low-frequency link. In step S2603, each time after acquiring the information on the low-frequency link, the gNB predicts a best transmission beam at each prediction time point based on the information on the low-frequency link. In step S2604, the UE predicts a best reception beam at each prediction time point based on the information on the low-frequency link. In step S2605, the gNB transmits, to the UE, time when beam switching is required and a transmission beam after switching. In step S2606, the gNB switches the transmission beam at the time when the transmission beam is required to switch. In step S2607, the UE switches a reception beam at time when the reception beam is required to switch. As mentioned above, the gNB predicts the best transmission beam using information on a low-frequency link, while the UE predicts the best reception beam using the information on the low-frequency link.

Figure 27:
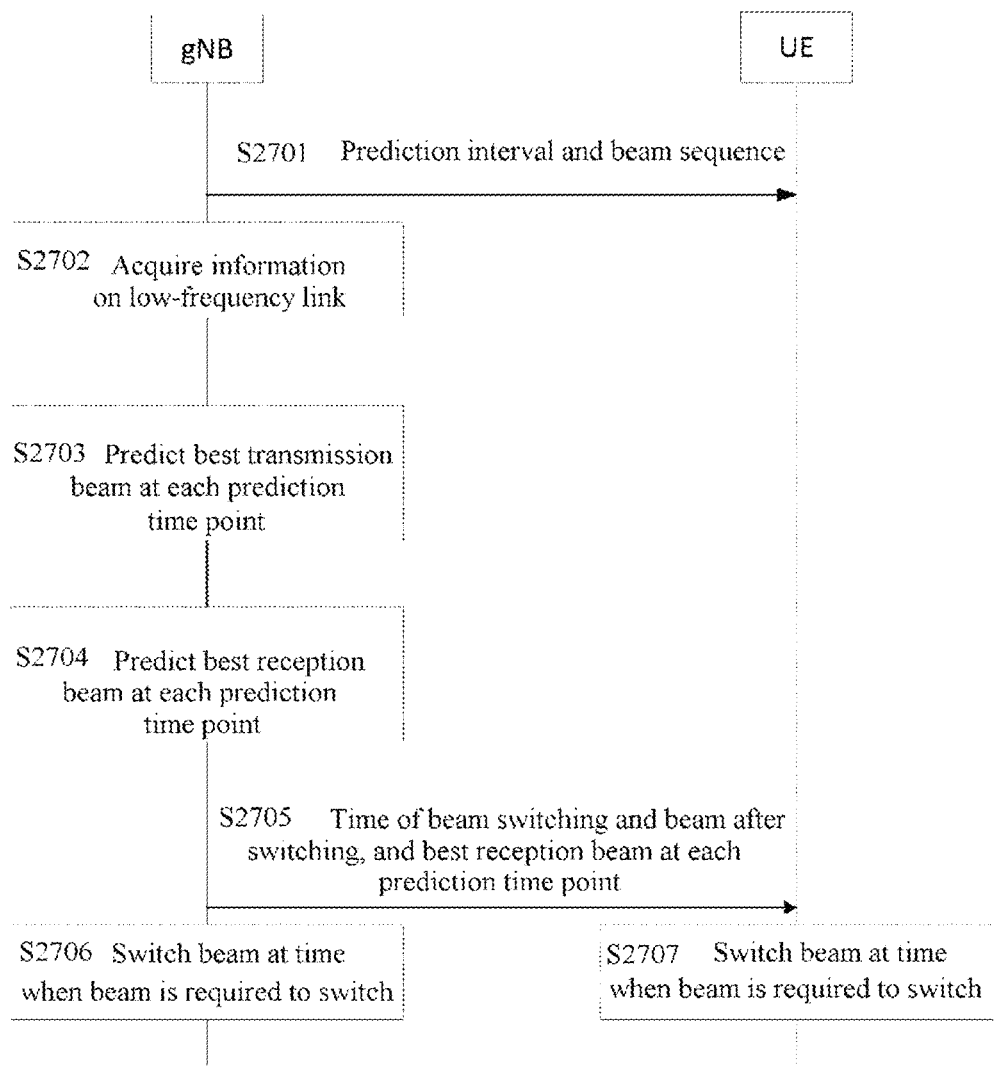
FIG. 27 is a flowchart showing signaling of a beam prediction scheme according to an embodiment of the present disclosure.

As shown in FIG. 27, in step S2701, a gNB transmits information on a prediction interval and information on a beam scanning sequence to a UE. In step S2702, the gNB acquires information on a low-frequency link. In step S2703, each time after acquiring the information on the low-frequency link, the gNB predicts a best transmission beam at each prediction time point based on the information on the low-frequency link. In step S2704, the gNB predicts a best reception beam of the UE at each prediction time point based on the information on the low-frequency link. In step S2705, the gNB transmits, to the UE, time when beam switching is required and a transmission beam after switching. Further, the gNB further transmits, to the UE, the predicted best reception beam of the UE at each prediction time point. In step S2706, the gNB switches the transmission beam at the time when the transmission beam is required to switch. In step S2707, the UE switches a reception beam at time when the reception beam is required to switch. As mentioned above, the gNB predicts the best transmission beam using the information on the low-frequency link, and the gNB predicts the best reception beam using the information on the low-frequency link.

Figure 28:
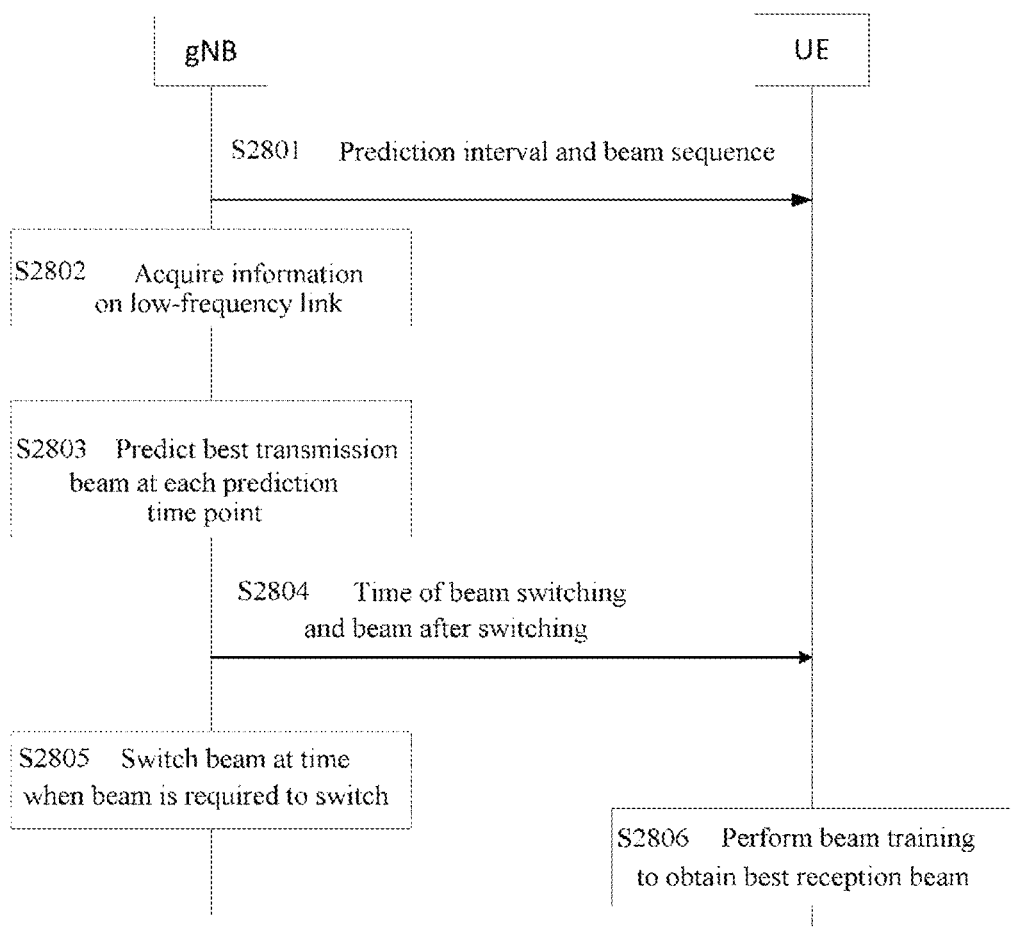
FIG. 28 is a flowchart showing signaling of a beam prediction scheme according to an embodiment of the present disclosure.

As shown in FIG. 28, in step S2801, a gNB transmits information on a prediction interval and information on a beam scanning sequence to a UE. In step S2802, the gNB acquires information on a low-frequency link. In step S2803, each time after acquiring the information on the low-frequency link, the gNB predicts a best transmission beam at each prediction time point based on the information on the low-frequency link. In step S2804, the gNB transmits, to the UE, time when beam switching is required and a transmission beam after switching. In step S2805, the gNB switches the transmission beam at the time when the transmission beam is required to switch. In step S2806, at the time when the gNB is required to switch the transmission beam, the UE performs beam training to obtain a best reception beam. As mentioned above, the gNB predicts the best transmission beam using information on a low-frequency link, while the UE determines the best reception beam by means of beam training.

4. Method Embodiments

Hereinafter, a wireless communication method performed by an electronic device 1200 as a network side device in a wireless communication system according to an embodiment of the present disclosure is described in detail.

Figure 29:
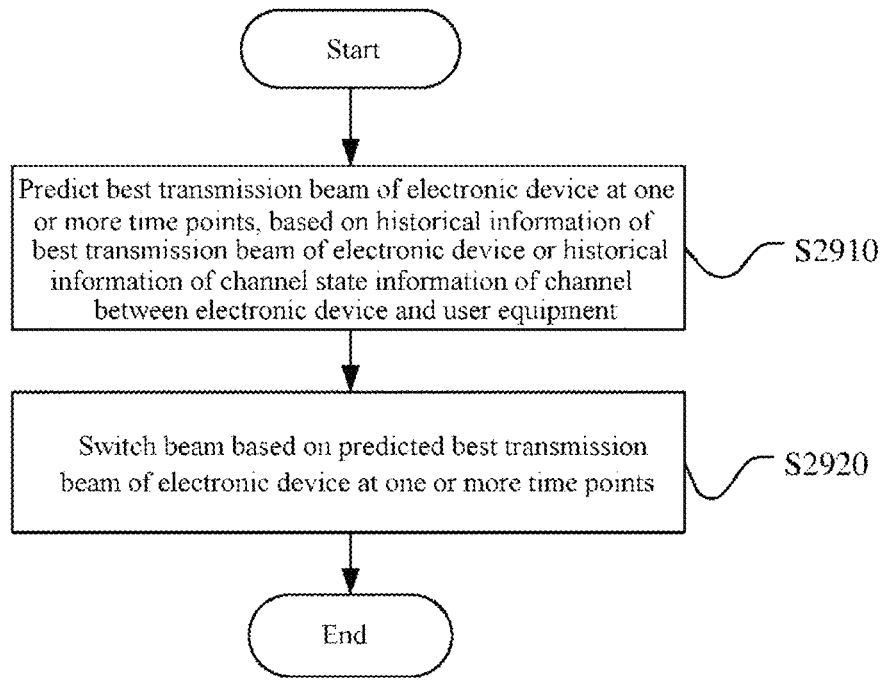
FIG. 29 is a flowchart showing a wireless communication method performed by an electronic device according to an embodiment of the present disclosure.

FIG. 29 is a flowchart showing a wireless communication method performed by an electronic device 1200 as a network side device in a wireless communication system according to an embodiment of the present disclosure.

As shown in FIG. 29, in step S2910, a best transmission beam of the electronic device 1200 at one or more time points is predicted based on historical information of a best transmission beam of the electronic device 1200 or historical information of channel state information of a channel between the electronic device 1200 and a user equipment.

Next, in step S2920, beam switching is performed based on the predicted best transmission beam of the electronic device 1200 at the one or more time points.

Preferably, the wireless communication method further includes: predicting the best transmission beam of the electronic device 1200 at the one or more time points based on historical information of a reception quality of a transmission beam adjacent to the best transmission beam of the electronic device 1200, where the transmission beam adjacent to the best transmission beam of the electronic device 1200 includes a transmission beam whose spatial distance from the best transmission beam is within a predetermined range.

Preferably, the wireless communication method further includes: performing a beam training process with the user equipment at a first cycle to receive the best transmission beam of the electronic device 1200 from the user equipment; and performing, after each beam training process is performed, a prediction process, to predict the best transmission beam of the electronic device 1200 at one or more time points before a next beam training process is performed.

Preferably, the wireless communication method further includes: estimating a movement feature of the user equipment based on the historical information of the best transmission beam or the historical information of the channel state information; estimating a relative direction between the user equipment and the electronic device 1200 at one or more time points based on the movement feature of the user equipment; and predicting the best transmission beam of the electronic device 1200 at the one or more time points based on the estimated relative direction between the user equipment and the electronic device 1200 at the one or more time points.

Preferably, the wireless communication method further includes: predicting the best transmission beam of the electronic device 1200 at the one or more time points using a neural network model.

Preferably, the wireless communication method further includes: transmitting, to the user equipment, information about the one or more time points and/or information on beam sequence by which the electronic device 1200 performs beam scanning.

Preferably, the wireless communication method further includes: communicating with the user equipment through a high-frequency link and a low-frequency link; and predicting the best transmission beam of the electronic device 1200 for the high-frequency link at the one or more time points based on information on the low-frequency link, where the information on the low-frequency link includes the historical information of the best transmission beam for the low-frequency link or the historical information of the channel state information for the low-frequency link.

Preferably, the wireless communication method further includes: acquiring the information on the low-frequency link at a second cycle; and performing, each time after the information on the low-frequency link is acquired, a prediction process, to predict the best transmission beam of the electronic device 1200 at the one or more time points before next information on the low-frequency link is acquired.

Preferably, the wireless communication method further includes: predicting a best reception beam of the user equipment at one or more time points, based on historical information of a best reception beam of the user equipment or historical information of channel state information of a channel between the user equipment and the electronic device 1200; and transmitting the predicted best reception beam of the user equipment at the one or more time points to the user equipment.

Preferably, the wireless communication method further includes: predicting the best reception beam of the user equipment at the one or more time points based on historical information of a reception quality of a reception beam adjacent to the best reception beam of the user equipment, where the reception beam adjacent to the best reception beam of the user equipment includes a reception beam whose spatial distance from the best reception beam is within a predetermined range.

According to an embodiment of the present disclosure, a subject that performs the above method may be the electronic device 1200 according to the embodiments of the present disclosure, so all the previous embodiments regarding the electronic device 1200 are applicable herein.

Hereinafter, a wireless communication method performed by user equipment 2200 in a wireless communication system according to an embodiment of the present disclosure is described in detail.

Figure 30:
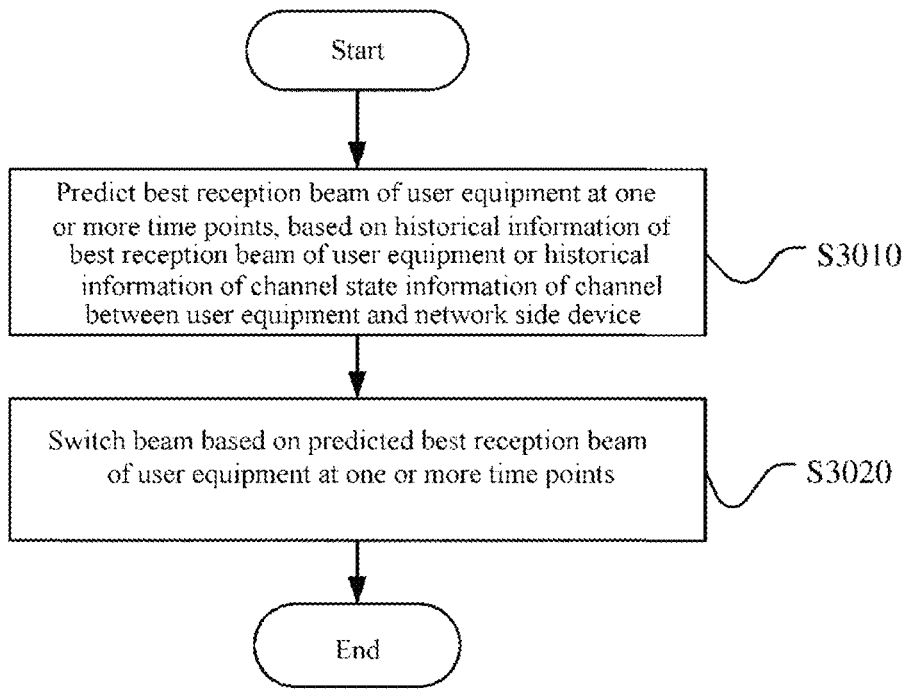
FIG. 30 is a flowchart showing a wireless communication method performed by a user equipment according to an embodiment of the present disclosure.

FIG. 30 is a flowchart showing a wireless communication method performed by user equipment 2200 in a wireless communication system according to an embodiment of the present disclosure.

As shown in FIG. 30, in step S3010, a best reception beam of the user equipment 2200 at one or more time points is predicted based on historical information of a best reception beam of the user equipment 2200 or historical information of channel state information of a channel between the user equipment 2200 and a network side device.

Next, in step S3020, beam switching is performed based on the predicted best reception beam of the user equipment 2200 at the one or more time points.

Preferably, the wireless communication method further includes: predicting the best reception beam of the user equipment 2200 at the one or more time points based on historical information of a reception quality of a reception beam adjacent to the best reception beam of the user equipment 2200, where the reception beam adjacent to the best reception beam of the user equipment 2200 includes a reception beam whose spatial distance from the best reception beam is within a predetermined range.

Preferably, the wireless communication method further includes: performing a beam training process with the network side device at a first cycle; and performing, after each beam training process is performed, a prediction process, to predict the best reception beam of the user equipment 2200 at the one or more time points before a next beam training process is performed.

Preferably, the wireless communication method further includes: transmitting, to the network side device, a best transmission beam of the network side device and a reception quality of a transmission beam adjacent to the best transmission beam of the network side device, after each beam training process is performed, where the transmission beam adjacent to the best transmission beam of the network side device includes an transmission beam whose spatial distance from the best transmission beam is within a predetermined range.

Preferably, the wireless communication method further includes: estimating a movement feature of the user equipment 2200 based on the historical information of the best reception beam or the historical information of the channel state information; estimating a relative direction between the user equipment 2200 and the network side device at one or more time points based on the movement feature of the user equipment 2200; and predicting the best reception beam of the user equipment 2200 at the one or more time points based on the estimated relative direction between the user equipment 2200 and the network side device at the one or more time points.

Preferably, the wireless communication method further includes: predicting the best reception beam of the user equipment 2200 at the one or more time points using a neural network model.

Preferably, the wireless communication method further includes: receiving, from the network side device, information about the one or more time points and/or information on beam sequence by which the network side device performs beam scanning.

Preferably, the wireless communication method further includes: communicating with the network side device through a high-frequency link and a low-frequency link; and predicting the best reception beam of the user equipment 2200 for the high-frequency link at the one or more time points, based on information on the low-frequency link, where the information on the low-frequency link includes the historical information of the best reception beam for the low-frequency link or the historical information of the channel state information for the low-frequency link.

Preferably, the wireless communication method further includes: acquiring the information on the low-frequency link at a second cycle; and performing, each time after the information on the low-frequency link is acquired, a prediction process, to predict the best reception beam of the user equipment 2200 at the one or more time points before next information on the low-frequency link is acquired.

According to an embodiment of the present disclosure, a subject that performs the above method may be the user equipment 2200 according to the embodiments of the present disclosure, so all the previous embodiments regarding the user equipment 2200 are applicable herein.

III. Application Example

The technology of the present disclosure is applicable to various products.

For example, the network side device may be implemented as any type of base station device, such as a macro eNB and a small eNB, and may be implemented as any type of gNB (a base station in a 5G system). The small eNB may be an eNB covering a cell smaller than a macro cell, such as a pico eNB, a micro eNB, or a home (femto) eNB. Alternatively, the base station may be implemented as any other type of base station, such as a NodeB and a base transceiver station (BTS). The base station may include a body (which is also referred to as a base station device) configured to control wireless communication and one or more remote radio heads (RRHs) that are arranged in a different place from the body.

The user equipment may be implemented as a mobile terminal (such as a smartphone, a tablet personal computer (PC), a notebook PC, a portable game terminal, a portable/dongle-type mobile router, and a digital camera), or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the user equipment described above.

Application Examples of a Base Station

First Application Example

Figure 31:
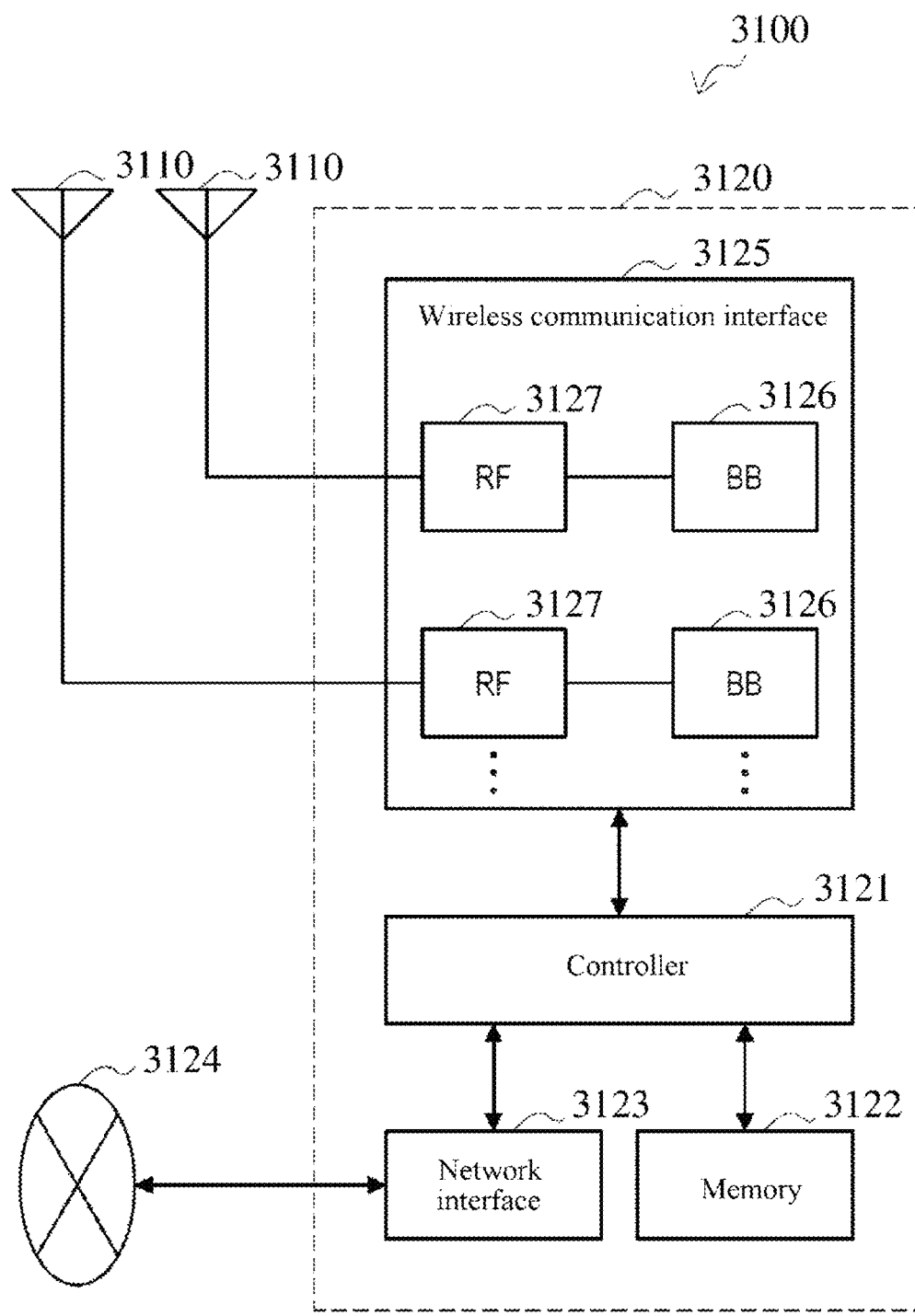
FIG. 31 is a block diagram showing a first example of a schematic configuration of an Evolved Node B (eNB)

FIG. 31 is a block diagram showing a first example of a schematic configuration of an eNB to which the technology of the present disclosure may be applied. The eNB 3100 includes a single or multiple antennas 3110 and a base station device 3120. The base station device 3120 and each of the antennas 3110 may be connected to each other via an RF cable.

Each of the antennas 3110 includes a single or multiple antenna elements (such as multiple antenna elements included in a multiple-input multiple-output (MIMO) antenna), and is used for the base station device 3120 to transmit and receive wireless signals. The eNB 3100 may include multiple antennas 3110, as shown in FIG. 31. For example, the multiple antennas 3110 may be compatible with multiple frequency bands used by the eNB 3100. Although FIG. 31 shows an example in which the eNB 3100 includes multiple antennas 3110, the eNB 3100 may include a single antenna 3110.

The base station device 3120 includes a controller 3121, a memory 3122, a network interface 3123, and a wireless communication interface 3125.

The controller 3121 may be, for example, a CPU or a DSP, and operates various functions of a higher layer of the base station device 3120. For example, the controller 3121 generates a data packet based on data in a signal processed by the wireless communication interface 3125, and transfers the generated packet via the network interface 3123. The controller 3121 may bundle data from multiple baseband processors to generate a bundled packet, and transfer the generated bundled packet. The controller 3121 may have logical functions of performing control such as radio resource control, radio bearer control, mobility management, admission control, and scheduling. The control may be performed in conjunction with an adjacent eNB or a core network node. The memory 3122 includes an RAM and an ROM, and stores a program executed by the controller 3121, and various types of control data (such as a terminal list, transmission power data, and scheduling data).

The network interface 3123 is a communication interface for connecting the base station device 3120 to a core network 3124. The controller 3121 may communicate with a core network node or another eNB via the network interface 3123. In this case, the eNB 3100, and the core network node or the other eNB may be connected to each other through a logical interface (such as an S1 interface and an X2 interface). The network interface 3123 may also be a wired communication interface or a wireless communication interface for a wireless backhaul line. In a case that the network interface 3123 is a wireless communication interface, the network interface 3123 may use a higher frequency band for wireless communication than a frequency band used by the wireless communication interface 3125.

The wireless communication interface 3125 supports any cellular communication scheme (such as Long Term Evolution (LTE) and LTE-Advanced), and provides wireless connection to a terminal positioned in a cell of the eNB 3100 via the antenna 3110. The wireless communication interface 3125 may typically include, for example, a baseband (BB) processor 3126 and a RF circuit 3127. The BB processor 3126 may perform, for example, encoding/decoding, modulating/demodulating and multiplexing/de-multiplexing, and perform various types of signal processes of layers (for example, L1, media access control (MAC), radio link control (RLC) and packet data convergence protocol (PDCP)). Instead of the controller 3121, the BB processor 3126 may have a part or all of the above logical functions. The BB processor 3126 may be a memory storing a communication control program, or a module including a processor and a related circuit configured to execute the program. Updating the program may change the functions of the BB processor 3126. The module may be a card or a blade inserted into a slot of the base station device 3120. Alternatively, the module may also be a chip mounted on the card or the blade. In addition, the RF circuit 3127 may include, for example, a frequency mixer, a filter and an amplifier, and transmit and receive wireless signals via the antenna 3110.

As shown in FIG. 31, the wireless communication interface 3125 may include multiple BB processors 3126. For example, the multiple BB processors 3126 may be compatible with multiple frequency bands used by the eNB 3100. As shown in FIG. 31, the wireless communication interface 3125 may include multiple RF circuits 3127. For example, the multiple RF circuits 3127 may be compatible with multiple antenna elements. Although FIG. 31 shows an example in which the wireless communication interface 3125 includes multiple BB processors 3126 and multiple RF circuits 3127, the wireless communication interface 3125 may include a single BB processor 3126 or a single RF circuit 3127.

Second Application Example

Figure 32:
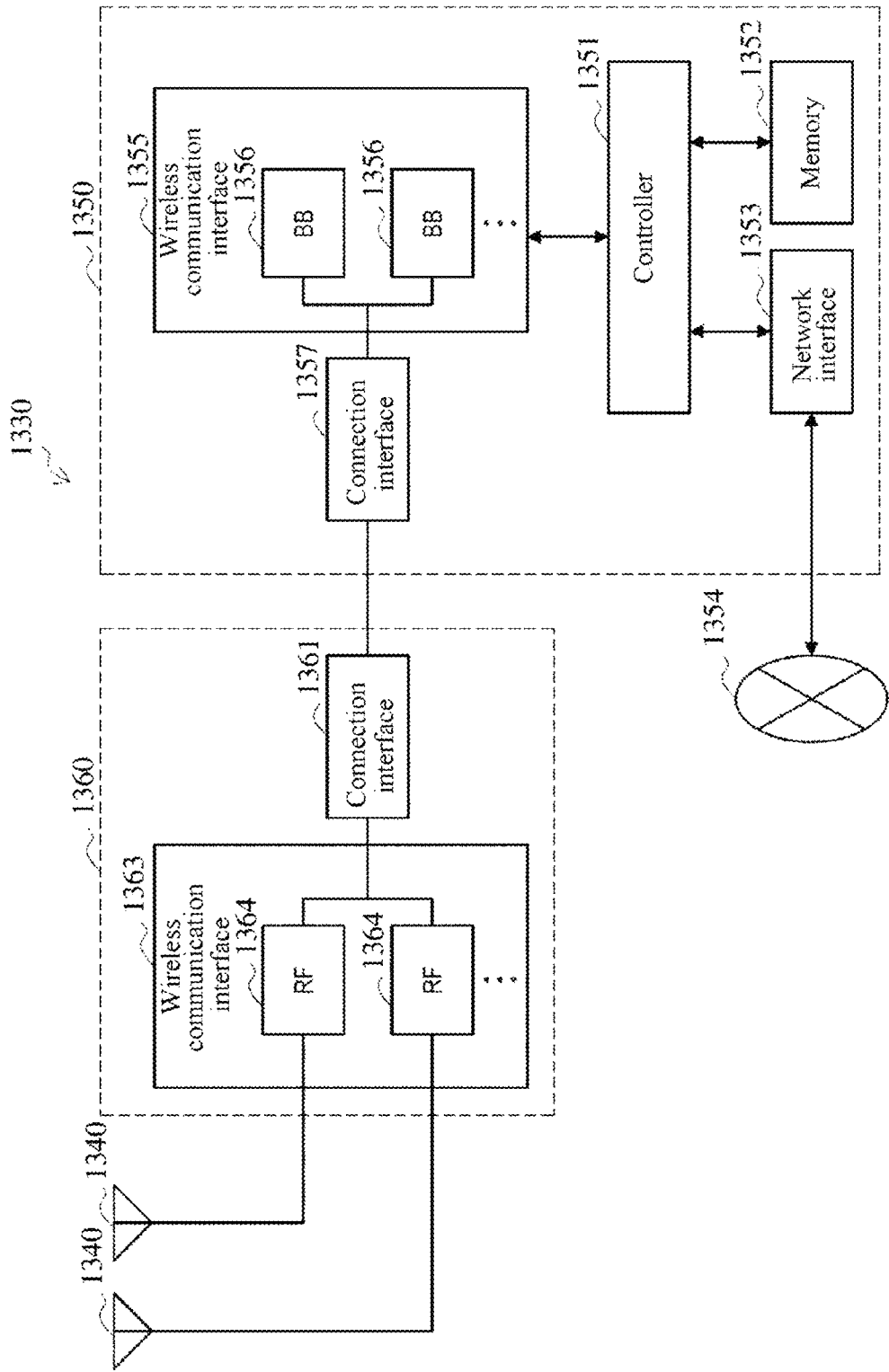
FIG. 32 is a block diagram showing a second example of a schematic configuration of an eNB.

FIG. 32 is a block diagram showing a second example of a schematic configuration of an eNB to which the technology of the present disclosure may be applied. The eNB 1330 includes a single or multiple antennas 1340, a base station device 1350 and an RRH 1360. The RRH 1360 and each antenna 1340 may be connected to each other via an RF cable. The base station device 1350 and the RRH 1360 may be connected to each other via a high-speed line such as an optical fiber cable.

Each of the antennas 1340 includes a single or multiple antenna elements (such as multiple antenna elements included in an MIMO antenna), and is used for the RRH 1360 to transmit and receive wireless signals. As shown in FIG. 32, the eNB 1330 may include multiple antennas 1340. For example, the multiple antennas 1340 may be compatible with multiple frequency bands used by the eNB 1330. Although FIG. 32 shows an example in which the eNB 1330 includes multiple antennas 1340, the eNB 1330 may include a single antenna 1340.

The base station device 1350 includes a controller 1351, a memory 1352, a network interface 1353, a wireless communication interface 1355, and a connection interface 1357. The controller 1351, the memory 1352, and the network interface 1353 are the same as the controller 3121, the memory 3122, and the network interface 3123 described with reference to FIG. 31. The network interface 1353 is a communication interface for connecting the base station device 1350 to a core network 1354.

The wireless communication interface 1355 supports any cellular communication scheme (such as LTE and LTE-advanced), and provides wireless communication with a terminal located in a sector corresponding to the RRH 1360 via the RRH 1360 and the antenna 1340. The wireless communication interface 1355 may typically include, for example, a BB processor 1356. The BB processor 1356 is the same as the BB processor 3126 described with reference to FIG. 31, except that the BB processor 1356 is connected to a RF circuit 1364 of the RRH 1360 via the connection interface 1357. As shown in FIG. 32, the wireless communication interface 1355 may include multiple BB processors 1356. For example, the multiple BB processors 1356 may be compatible with multiple frequency bands used by the eNB 1330. Although FIG. 32 shows an example in which the wireless communication interface 1355 includes multiple BB processors 1356, the wireless communication interface 1355 may include a single BB processor 1356.

The connection interface 1357 is an interface for connecting the base station device 1350 (the wireless communication interface 1355) to the RRH 1360. The connection interface 1357 may also be a communication module for communication in the above high-speed line that connects the base station device 1350 (the wireless communication interface 1355) to the RRH 1360.

The RRH 1360 includes a connection interface 1361 and a wireless communication interface 1363.

The connection interface 1361 is an interface for connecting the RRH 1360 (the wireless communication interface 1363) to the base station device 1350. The connection interface 1361 may also be a communication module for communication in the above high-speed line.

The wireless communication interface 1363 transmits and receives wireless signals via the antenna 1340. The wireless communication interface 1363 may typically include, for example, the RF circuit 1364. The RF circuit 1364 may include, for example, a frequency mixer, a filter and an amplifier, and transmit and receive wireless signals via the antenna 1340. The wireless communication interface 1363 may include multiple RF circuits 1364, as shown in FIG. 32. For example, the multiple RF circuits 1364 may support multiple antenna elements. Although FIG. 32 shows an example in which the wireless communication interface 1363 includes multiple RF circuits 1364, the wireless communication interface 1363 may include a single RF circuit 1364.

In the eNB 3100 shown in FIG. 31 and the eNB 1330 shown in FIG. 32, the configuration unit 120, the beam pair determination unit 130, the reference signal pair determination unit 140, the determination unit 150 and the generation unit 160 described in connection with FIG. 1, and the prediction unit 1210, the switching unit 1220, the training unit 1240 and the configuration unit 1260 described in connection with FIG. 12 may be implemented by the controller 3121 and/or the controller 1351. At least a part of the functions may be implemented by the controller 3121 and the controller 1351. For example, the controller 3121 and/or the controller 1351 may perform functions of configuring a beamforming parameter, determining a beam pair, generating a reference signal pair, determining a beam with a best reception quality, generating configuration information, predicting a best transmission beam, predicting a best reception beam, switching a beam, storing historical information, performing beam training, and configuring a beam scanning sequence and a prediction interval, by executing instructions stored in a corresponding memory.

<Application Examples of a Terminal Device>

First Application Example

Figure 33:
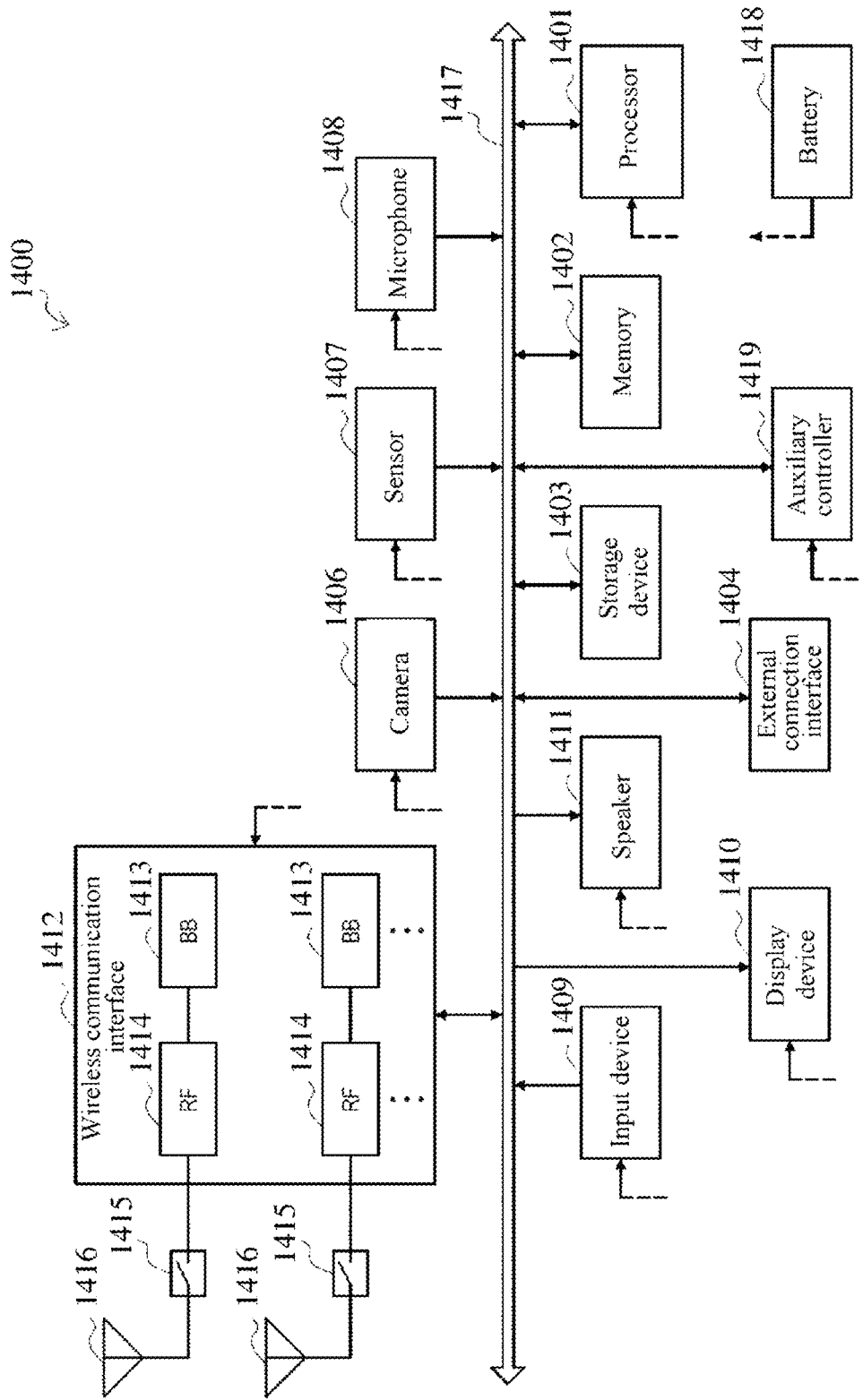
FIG. 33 is a block diagram showing an example of a schematic configuration of a smartphone.

FIG. 33 is a block diagram showing an example of a schematic configuration of a smartphone 1400 to which the technology of the present disclosure may be applied. The smartphone 1400 includes a processor 1401, a memory 1402, a storage device 1403, an external connection interface 1404, a camera 1406, a sensor 1407, a microphone 1408, an input device 1409, a display device 1410, a speaker 1411, a wireless communication interface 1412, one or more antenna switches 1415, one or more antennas 1416, a bus 1417, a battery 1418 and an auxiliary controller 1419.

The processor 1401 may be, for example, a CPU or a system on chip (SoC), and control functions of an application layer and another layer of the smartphone 1400. The memory 1402 includes an RAM and an ROM, and stores a program that is executed by the processor 1401, and data. The storage device 1403 may include a storage medium such as a semiconductor memory and a hard disk. The external connection interface 1404 is an interface for connecting an external device (such as a memory card and a universal serial bus (USB) device) to the smartphone 1400.

The camera 1406 includes an image sensor (such as a charge coupled device (CCD) and a complementary metal oxide semiconductor (CMOS)) and generates a captured image. The sensor 1407 may include a group of sensors, such as a measurement sensor, a gyroscope sensor, a geomagnetic sensor and an acceleration sensor. The microphone 1408 converts sounds that are inputted to the smartphone 1400 into audio signals. The input device 1409 includes, for example, a touch sensor configured to detect touch on a screen of the display device 1410, a keypad, a keyboard, a button, or a switch, and receives an operation or information inputted from a user. The display device 1410 includes a screen (such as a liquid crystal display (LCD) and an organic light-emitting diode (OLED) display), and displays an output image of the smartphone 1400. The speaker 1411 converts audio signals that are outputted from the smartphone 1400 to sounds.

The wireless communication interface 1412 supports any cellular communication scheme (such as LTE and LTE-Advanced), and performs wireless communications. The wireless communication interface 1412 may typically include, for example, a BB processor 1413 and a RF circuit 1414. The BB processor 1413 may perform, for example, encoding/decoding, modulating/demodulating and multiplexing/de-multiplexing, and perform various types of signal processing for wireless communications. Meanwhile, the RF circuit 1414 may include, for example, a frequency mixer, a filter and an amplifier, and transmit and receive wireless signals via the antenna 1416. The wireless communication interface 1412 may be a chip module on which the BB processor 1413 and the RF circuit 1414 are integrated. As shown in FIG. 33, the wireless communication interface 1412 may include multiple BB processors 1413 and multiple RF circuits 1414. Although FIG. 33 shows an example in which the wireless communication interface 1412 includes multiple BB processors 1413 and multiple RF circuits 1414, the wireless communication interface 1412 may include a single BB processor 1413 or a single RF circuit 1414.

Furthermore, in addition to the cellular communication scheme, the wireless communication interface 1412 may support another type of wireless communication scheme such as a short-distance wireless communication scheme, a near field communication scheme, and a wireless local area network (LAN) scheme. In this case, the wireless communication interface 1412 may include a BB processor 1413 and a RF circuit 1414 for each wireless communication scheme.

Each of the antenna switches 1415 switches a connection destination of the antenna 1416 among multiple circuits (such as circuits for different wireless communication schemes) included in the wireless communication interface 1412.

Each of the antennas 1416 includes a single or multiple antenna elements (such as multiple antenna elements included in an MIMO antenna), and is used for the wireless communication interface 1412 to transmit and receive wireless signals. The smartphone 1400 may include multiple antennas 1416, as shown in FIG. 33. Although FIG. 33 shows an example in which the smartphone 1400 includes multiple antennas 1416, the smartphone 1400 may include a single antenna 1416.

Furthermore, the smartphone 1400 may include an antenna 1416 for each wireless communication scheme. In this case, the antenna switch 1415 may be omitted from the configuration of the smartphone 1400.

The processor 1401, the memory 1402, the storage device 1403, the external connection interface 1404, the camera 1406, the sensor 1407, the microphone 1408, the input device 1409, the display device 1410, the speaker 1411, the wireless communication interface 1412 and the auxiliary controller 1419 are connected to each other via the bus 1417. The battery 1418 supplies power to blocks in the smartphone 1400 shown in FIG. 33 via a feeder line which is indicated partially as a dashed line in FIG. 33. The auxiliary controller 1419 operates a minimum necessary function of the smartphone 1400 in a sleeping mode, for example.

In the smartphone 1400 shown in FIG. 33, the determination unit 920 and the generation unit 930 described in connection with FIG. 9, and the prediction unit 2210, the switching unit 2220, the training unit 2240, and the generation unit 2260 described in connection with FIG. 22 may be implemented by the processor 1401 or the auxiliary controller 1419. At least a part of the functions may be implemented by the processor 1401 or the auxiliary controller 1419. For example, the processor 1401 or the auxiliary controller 1419 may perform functions of determining a downlink signal with a best reception quality, determining a beam with a best reception quality, generating feedback information, predicting a best reception beam, switching a beam, performing beam training, and generating a best transmission beam and corresponding reception quality information, by executing instructions stored in the memory 1402 or the storage device 1403.

Second Application Example

Figure 34:
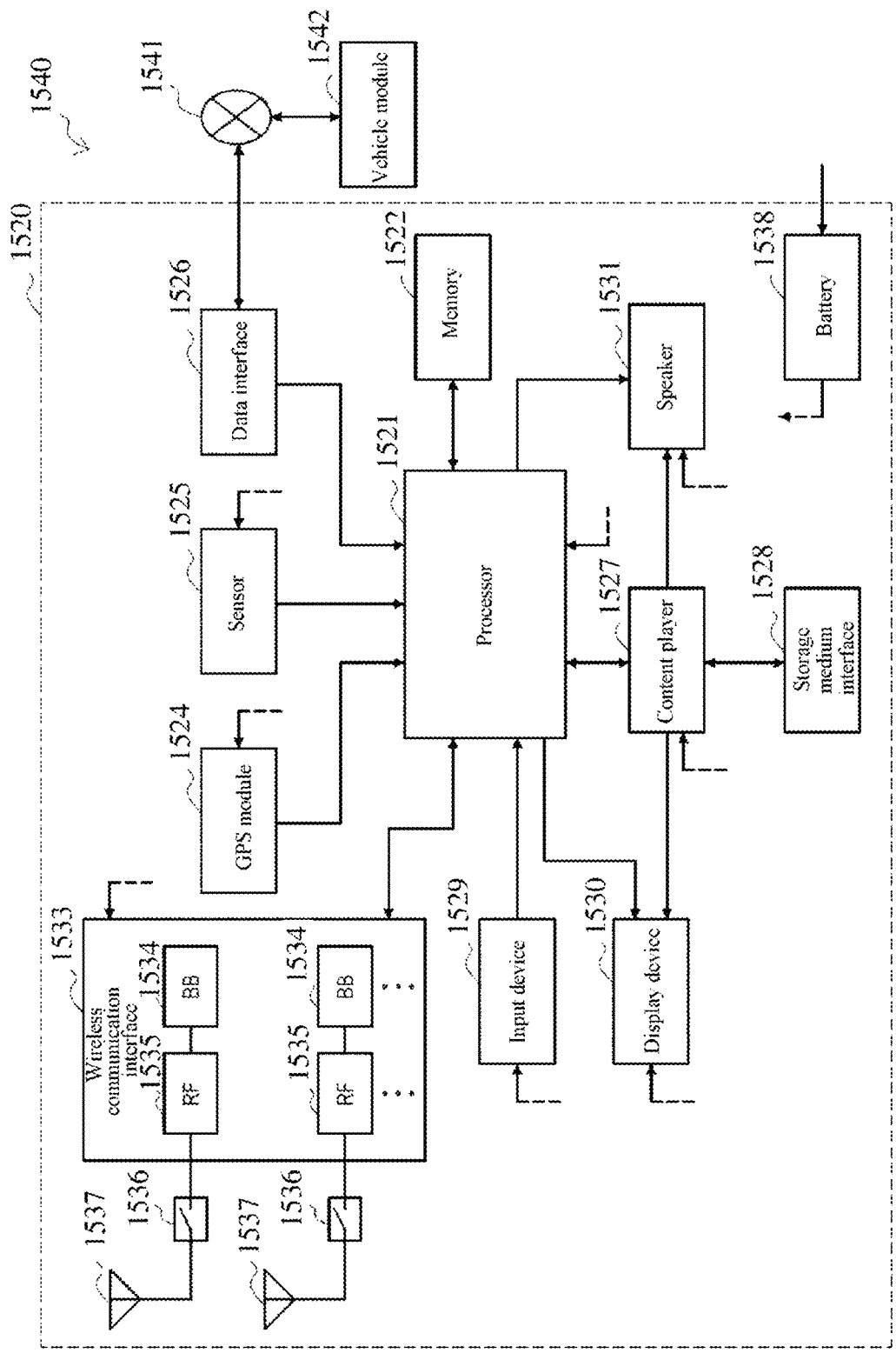
FIG. 34 is a block diagram showing an example of a schematic configuration of a car navigation device.

FIG. 34 is a block diagram showing an example of a schematic configuration of a car navigation device 1520 to which the technology of the present disclosure may be applied. The car navigation device 1520 includes a processor 1521, a memory 1522, a global positioning system (GPS) module 1524, a sensor 1525, a data interface 1526, a content player 1527, a storage medium interface 1528, an input device 1529, a display device 1530, a speaker 1531, a wireless communication interface 1533, one or more antenna switches 1536, one or more antennas 1537 and a battery 1538.

The processor 1521 may be, for example, a CPU or an SoC, and control a navigation function and another function of the car navigation device 1520. The memory 1522 includes an RAM and an ROM, and stores a program that is executed by the processor 1521, and data.

The GPS module 1524 measures a position (such as latitude, longitude and altitude) of the car navigation device 1520 based on a GPS signal received from a GPS satellite. The sensor 1525 may include a group of sensors such as a gyroscope sensor, a geomagnetic sensor, and an air pressure sensor. The data interface 1526 is connected to, for example, an in-vehicle network 1541 via a terminal not shown, and acquires data generated by the vehicle (such as vehicle speed data).

The content player 1527 reproduces content stored in a storage medium (such as a CD and a DVD) inserted into the storage medium interface 1528. The input device 1529 includes, for example, a touch sensor configured to detect touch on a screen of the display device 1530, a button, or a switch, and receives an operation or information inputted from a user. The display device 1530 includes a screen such as an LCD or an OLED display, and displays an image of the navigation function or content that is reproduced. The speaker 1531 outputs sound of the navigation function or the content that is reproduced.

The wireless communication interface 1533 supports any cellular communication scheme (such as LTE and LTE-Advanced), and performs wireless communications. The wireless communication interface 1533 may typically include, for example, a BB processor 1534 and a RF circuit 1535. The BB processor 1534 may perform, for example, encoding/decoding, modulating/demodulating and multi-plexing/de-multiplexing, and perform various types of signal processing for wireless communications. Meanwhile, the RF circuit 1535 may include, for example, a frequency mixer, a filter and an amplifier, and transmit and receive wireless signals via the antenna 1537. The wireless communication interface 1533 may also be a chip module on which the BB processor 1534 and the RF circuit 1535 are integrated. As shown in FIG. 34, the wireless communication interface 1533 may include multiple BB processors 1534 and multiple RF circuits 1535. Although FIG. 34 shows an example in which the wireless communication interface 1533 includes multiple BB processors 1534 and multiple RF circuits 1535, the wireless communication interface 1533 may include a single BB processor 1534 or a single RF circuit 1535.

Furthermore, in addition to the cellular communication scheme, the wireless communication interface 1533 may support another type of wireless communication scheme such as a short-distance wireless communication scheme, a near field communication scheme, and a wireless LAN scheme. In this case, the wireless communication interface 1533 may include a BB processor 1534 and a RF circuit 1535 for each type of wireless communication scheme.

Each of the antenna switches 1536 switches a connection destination of the antenna 1537 among multiple circuits (such as circuits for different wireless communication schemes) included in the wireless communication interface 1533.

Each of the antennas 1537 includes a single or multiple antenna elements (such as multiple antenna elements included in an MIMO antenna), and is used for the wireless communication interface 1533 to transmit and receive wireless signals. The car navigation device 1520 may include multiple antennas 1537, as shown in FIG. 34. Although FIG. 34 shows an example in which the car navigation device 1520 includes multiple antennas 1537, the car navigation device 1520 may include a single antenna 1537.

In addition, the car navigation device 1520 may include an antenna 1537 for each type of wireless communication scheme. In this case, the antenna switch 1536 may be omitted from the configuration of the car navigation device 1520.

The battery 1538 supplies power to blocks in the car navigation device 1520 shown in FIG. 34 via a feeder line which is indicated partially as a dashed line in FIG. 34. The battery 1538 accumulates power supplied from the vehicle.

In the car navigation device 1520 shown in FIG. 34, the determination unit 920 and the generation unit 930 described in connection with FIG. 9, and the prediction unit 2210, the switching unit 2220, the training unit 2240, and the generation unit 2260 described in connection with FIG. 22 may be implemented by the processor 1521. At least a part of the functions may be implemented by the processor 1521. For example, the processor 1521 may perform functions of determining a downlink signal with a best reception quality, determining a beam with a best reception quality, generating feedback information, predicting a best reception beam, switching a beam, performing beam training, and generating a best transmission beam and corresponding reception quality information, by executing instructions stored in the memory 1522.

The technology of the present disclosure may also be implemented as an in-vehicle system (or a vehicle) 1540 including one or more blocks of the car navigation device 1520, the in-vehicle network 1541 and a vehicle module 1542. The vehicle module 1542 generates vehicle data (such as vehicle speed, engine speed, and fault information), and outputs the generated data to the in-vehicle network 1541.

Preferred embodiments of the present disclosure have been described above with reference to the drawings. However, the present disclosure is not limited to the above examples. Those skilled in the art may make various changes and modifications within the scope of the appended claims, and it should be understood that such changes and modifications naturally fall within the technical scope of the present disclosure.

For example, a unit shown by a dotted line box in the functional block diagram in the drawings indicates that the functional unit is optional in the corresponding device, and the optional functional units may be combined appropriately to achieve desired functions.

For example, multiple functions implemented by one unit in the above embodiments may be implemented by separate devices. Alternatively, multiple functions implemented by respective units in the above embodiments may be implemented by separate devices, respectively. In addition, one of the above functions may be implemented by multiple units. Such configurations are naturally included in the technical scope of the present disclosure.

In the specification, steps described in the flowchart include not only the processes performed chronologically as the described sequence, but also the processes performed in parallel or individually rather than chronologically. Furthermore, the steps performed chronologically may be performed in another sequence appropriately.

Embodiments of the present disclosure are described above in detail in conjunction with the drawings. However, it should be understood that the embodiments described above are intended to illustrate the present disclosure rather than limit the present disclosure. Those skilled in the art may make various modifications and alternations to the above embodiments without departing from the spirit and scope of the present disclosure. Therefore, the scope of the present disclosure is defined by the appended claims and equivalents thereof.

The invention claimed is:

1. An electronic device, comprising a processing circuit configured to:
    transmit two reference signals using a same time-frequency resource and using two beams in a beam pair, respectively, wherein a spatial distance between the two beams in the beam pair is greater than a predetermined value, and the two reference signals satisfy a predetermined constraint relationship.

2. The electronic device according to claim 1, wherein the processing circuit is further configured to:
    for an i-th beam, determine that an (i+N)-th beam belongs to a same beam pair as the i-th beam, wherein i is greater than or equal to 1 and less than or equal to L-N, and L is the total number of beams.

3. The electronic device according to claim 1, wherein the predetermined constraint relationship comprises: a product of a conjugate of a second reference signal of the two reference signals and a first reference signal of the two reference signals is a constant.

4. The electronic device according to claim 1, wherein the processing circuit is further configured to:
generate a first reference signal of the two reference signals; and
generate a second reference signal of the two reference signals based on the predetermined constraint relationship and the first reference signal, or
wherein the processing circuit is further configured to:
transmit a first reference signal of the two reference signals using a first beam in the beam pair, and transmit a second reference signal of the two reference signals using a second beam in the beam pair; or
transmit a second reference signal of the two reference signals using a first beam in the beam pair, and transmit a first reference signal of the two reference signals using a second beam in the beam pair.

5. The electronic device according to claim 1, wherein the processing circuit is further configured to:
receive feedback information; and
determine a beam with a best reception quality based on the feedback information.

6. The electronic device according to claim 5, wherein the processing circuit is further configured to:
determine, based on an identification of a Channel State Information-Reference Signal, CSI-RS, resource or a Synchronization Signal Block, SSB, resource in the feedback information, a beam pair to which the beam with the best reception quality belongs; and
determine, based on an identification of a reference signal in the feedback information, the beam with the best reception quality from the beam pair to which the beam with the best reception quality belongs.

7. The electronic device according to claim 1, wherein the processing circuit is further configured to:
transmit configuration information, wherein the configuration information comprises a first reference signal and a second reference signal of the two reference signals, and the predetermined constraint relationship, or
wherein the processing circuit is further configured to:
generate the two beams in the beam pair using a same antenna array; or
generate the two beams in the beam pair using two antenna arrays respectively, and perform phase compensation for at least one beam of the two beams based on a distance between the two antenna arrays.

8. An electronic device, comprising processing circuit configured to:
receive a plurality of downlink signals, each of the downlink signals comprising two reference signals transmitted using a same time-frequency resource and using two beams, respectively, wherein a spatial distance between the two beams is greater than a predetermined value, and the two reference signals satisfy a predetermined constraint relationship;
determine a downlink signal with a best reception quality from the plurality of downlink signals; and
determine a beam with a best reception quality from two beams carrying the downlink signal with the best reception quality.

9. The electronic device according to claim 8, wherein the processing circuit is further configured to:
generate a first comparison signal based on the downlink signal with the best reception quality and a first reference signal of the two reference signals;
generate a second comparison signal based on the downlink signal with the best reception quality and a second reference signal of the two reference signals; and
determine the beam with the best reception quality based on a real part or an imaginary part of the first comparison signal and a real part or an imaginary part of the second comparison signal.

10. The electronic device according to claim 8, wherein the processing circuit is further configured to:
generate feedback information, wherein the feedback information comprises an identification of a Channel State Information-Reference Signal, CSI-RS, resource or a Synchronization Signal Block, SSB, resource corresponding to the two beams carrying the downlink signal with the best reception quality, and an identification of a reference signal carried by the beam with the best reception quality; or
an identification of a Channel State Information-Reference Signal, CSI-RS, resource or a Synchronization Signal Block, SSB, resource corresponding to the two beams carrying the downlink signal with the best reception quality, an identification of a reference signal carried by the beam with the best reception quality, and reception quality information of the downlink signal with the best reception quality.

11. The electronic device according to claim 8, wherein the processing circuit is further configured to:
receive configuration information, wherein the configuration information comprises a first reference signal and a second reference signal of the two reference signals, and the predetermined constraint relationship.

* * * * *